(12) United States Patent
Furuya

(10) Patent No.: US 10,120,147 B2
(45) Date of Patent: Nov. 6, 2018

(54) METHOD OF FABRICATING OPTICAL COMMUNICATION APPARATUS, OPTICAL CONNECTING PART, OPTICAL COMMUNICATION APPARATUS

(71) Applicant: SUMITOMO ELECTRIC INDUSTRIES, LTD., Osaka (JP)

(72) Inventor: Akira Furuya, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/636,040

(22) Filed: Jun. 28, 2017

(65) Prior Publication Data

US 2017/0299825 A1 Oct. 19, 2017

Related U.S. Application Data

(63) Continuation of application No. 15/339,058, filed on Oct. 31, 2016, now Pat. No. 9,791,643.

(30) Foreign Application Priority Data

Nov. 2, 2015 (JP) .................................. 2015-215889

(51) Int. Cl.
G02B 6/42 (2006.01)
G02B 6/44 (2006.01)

(52) U.S. Cl.
CPC ........... G02B 6/4231 (2013.01); G02B 6/421 (2013.01); G02B 6/4239 (2013.01); G02B 6/4244 (2013.01); G02B 6/4471 (2013.01)

(58) Field of Classification Search
CPC .. G02B 6/4231; G02B 6/4244; G02B 6/4471; G02B 6/421; G02B 6/4239
See application file for complete search history.

(56) References Cited

U.S. PATENT DOCUMENTS

| 5,867,620 | A | * | 2/1999 | Bunin | G02B 6/3834 385/53 |
| 7,118,285 | B2 | * | 10/2006 | Fenwick | G02B 6/3885 385/57 |
| 9,695,646 | B2 | * | 7/2017 | Grice | E21B 17/028 |

FOREIGN PATENT DOCUMENTS

JP H8-278425 10/1996

OTHER PUBLICATIONS

Notice of Allowance dated Jun. 21, 2017 in U.S. Appl. No. 15/339,058 (Parent).

* cited by examiner

*Primary Examiner* — Ryan Lepisto
(74) *Attorney, Agent, or Firm* — Smith, Gambrell & Russell, LLP.

(57) ABSTRACT

A method for fabricating an optical transmitting apparatus includes steps of: preparing a temporary assembly including a stub device having an optical fiber, a magnetic guide member with a hole, and a holder, an optical connector, and an magnetic alignment member extending in a direction of an axis; applying a magnetic force to the alignment member of the temporary assembly with a magnet device of an electromagnet or a permanent magnet; carrying out optical alignment of the stub device with an optical device by active alignment, the stub device being optically coupled to the optical connector, and; separating the optical connector and the alignment member apart from the stub device. The alignment member is disposed in the hole of the stub device and a guide hole of the optical connector in the temporary assembly such that the alignment member aligns the stub device with the optical connector.

15 Claims, 19 Drawing Sheets

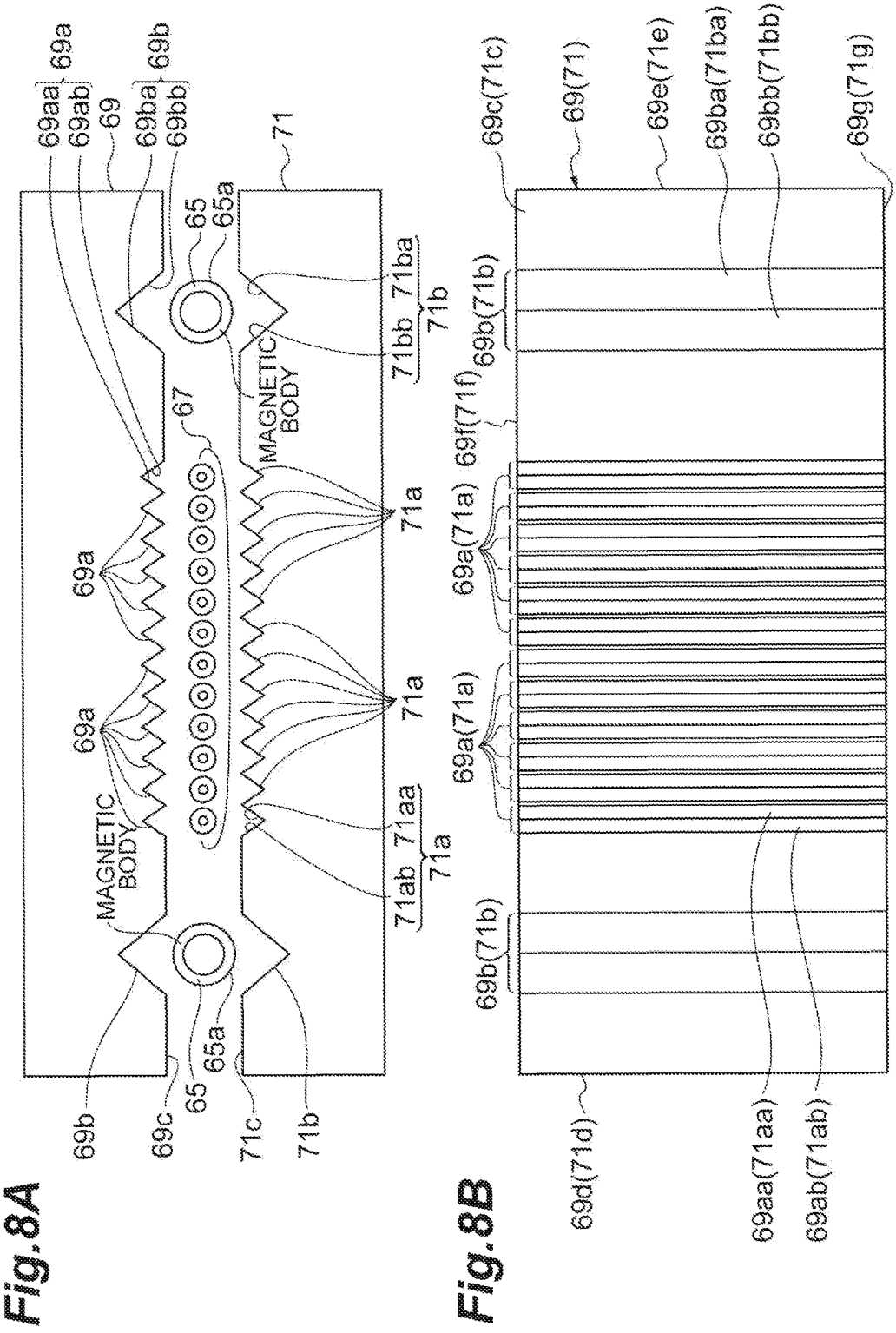

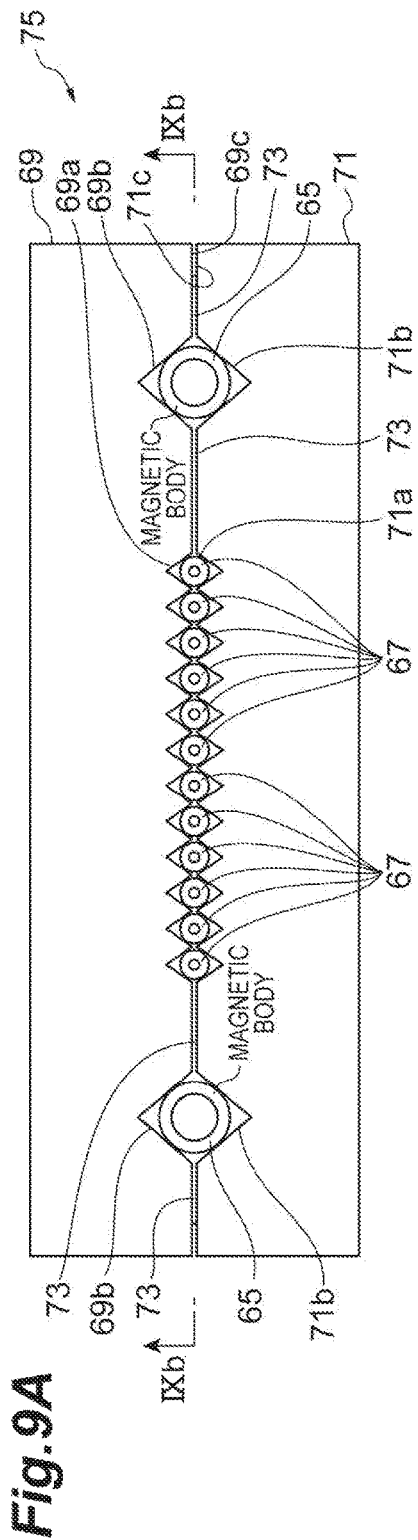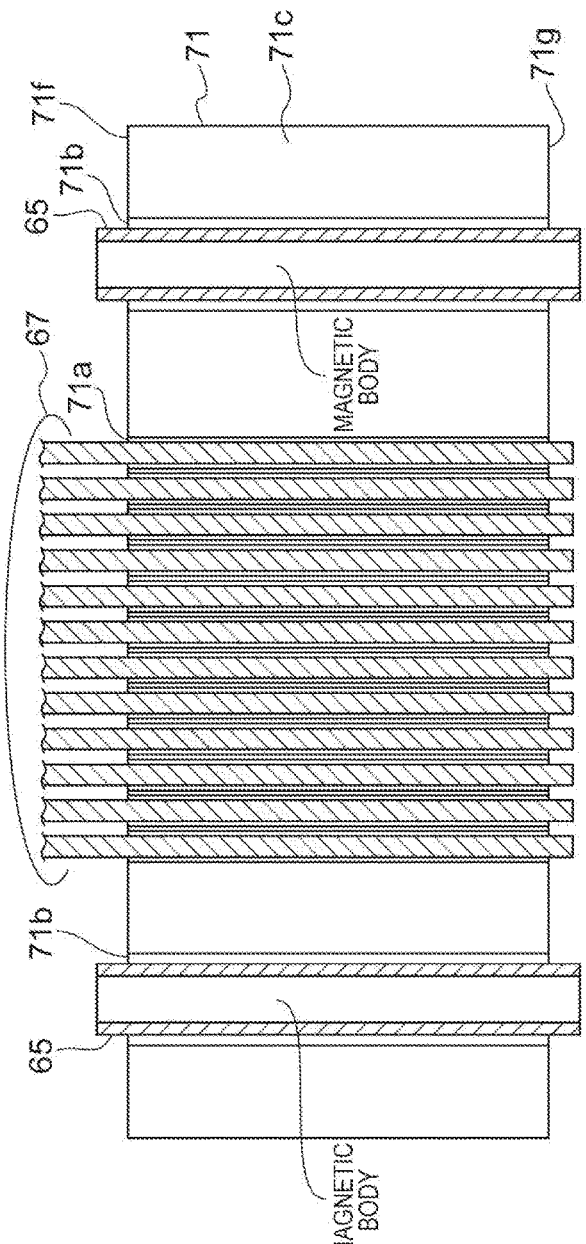

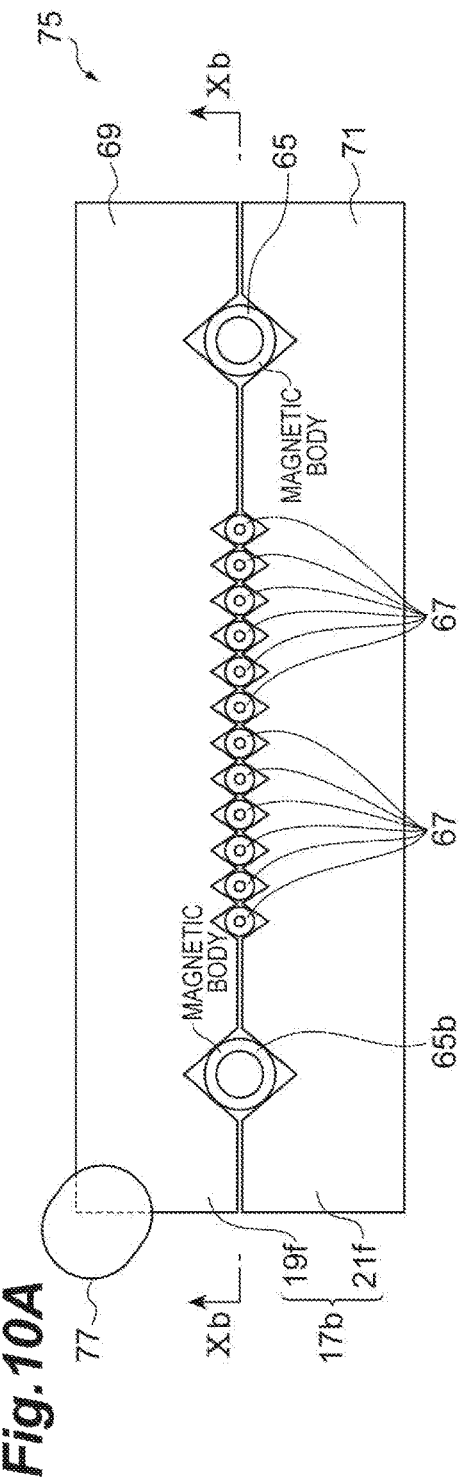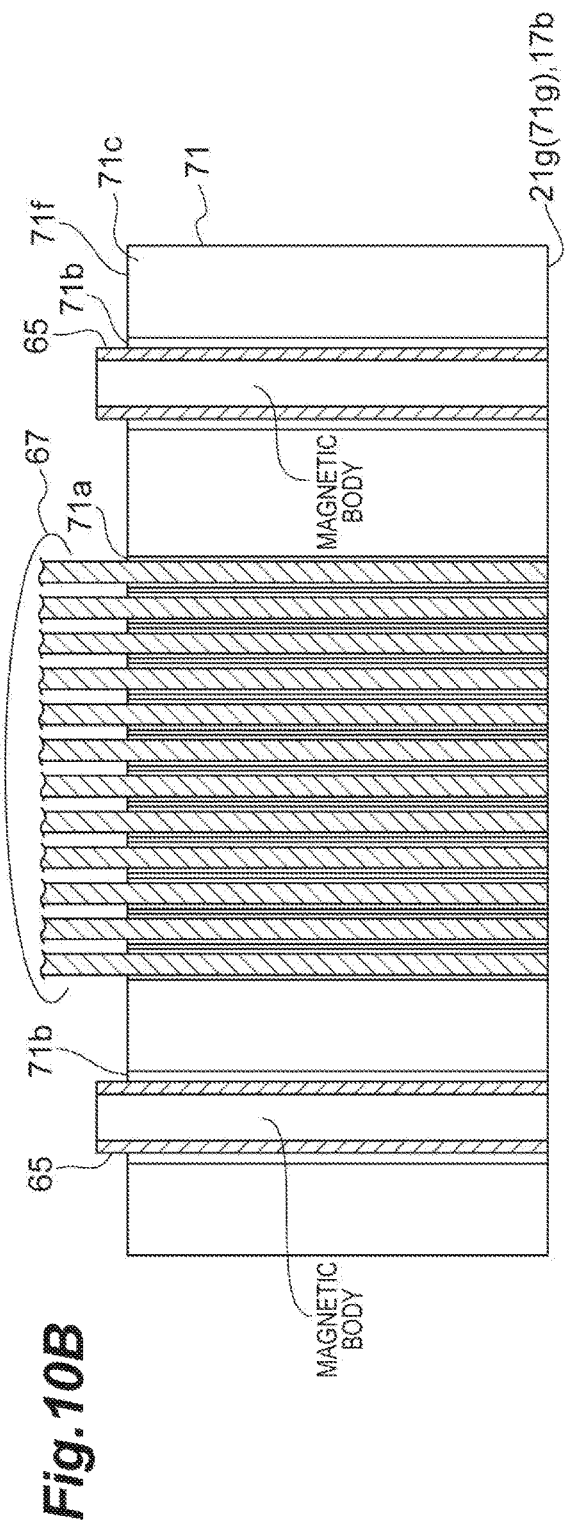

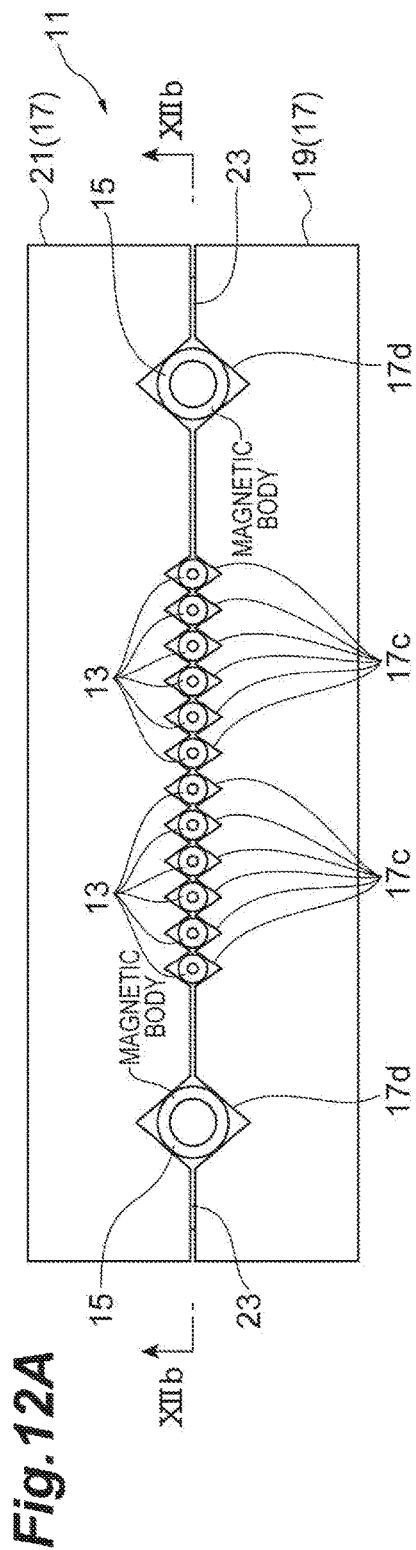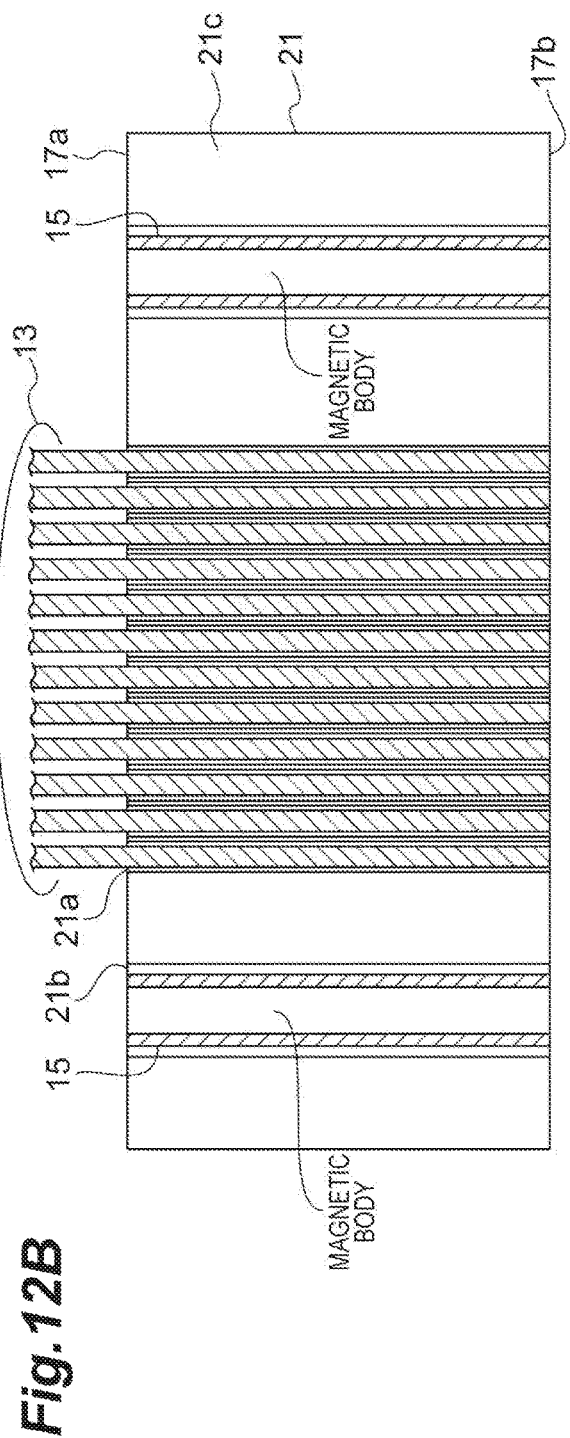

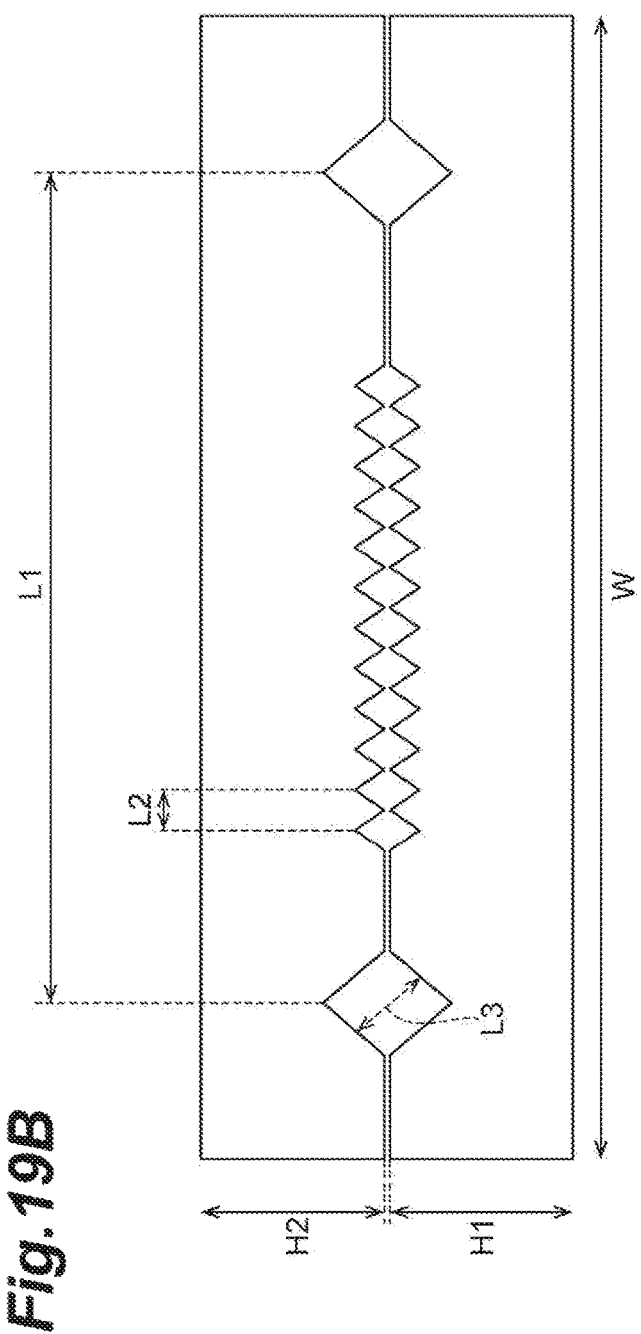
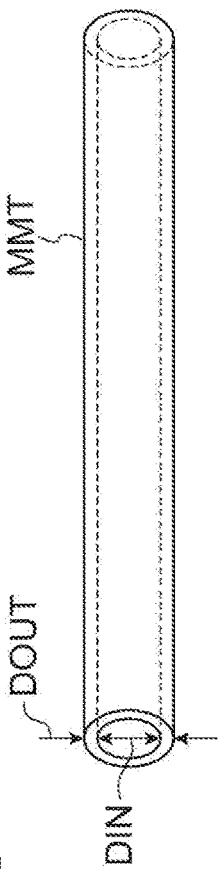

METHOD OF FABRICATING OPTICAL COMMUNICATION APPARATUS, OPTICAL CONNECTING PART, OPTICAL COMMUNICATION APPARATUS

This application is a continuation of U.S. application Ser. No. 15/339,058.

BACKGROUND OF THE INVENTION

Field of the Invention

The present invention relates to a method of fabricating an optical communication apparatus, an optical connecting part, and an optical communication. This application claims the benefit of priority from Japanese Patent Application No. 2015-215889 filed on Nov. 2, 2015, which is herein incorporated by reference in its entirety.

Related Background Art

Japanese Patent Laid Open Publication No. 08-278425, referred to as Patent Document 1, discloses an optical fiber stub.

SUMMARY OF THE INVENTION

A method for fabricating an optical transmitting apparatus according to one aspect of the present invention includes steps of: preparing a temporary assembly including a stub device, an optical connector, and an alignment member, the stub device including at least one optical fiber, a guide member having a magnetic body with a hole, and a holder supporting the guide member and the optical fiber, the optical connector having one or more optical waveguides and a guide hole, and the alignment member having a magnetic body extending in a direction of an axis; preparing an optical device to be coupled to the temporary assembly; applying a magnetic force to the alignment member of the temporary assembly with a magnet device; carrying out optical alignment of one of the stub device and the optical device to the other by active alignment in which the temporary assembly is moved on the optical device, after applying the magnetic force to the alignment member; and separating the optical connector and the alignment member apart from the stub device, after the optical alignment, the alignment member being disposed in the hole of the stub device and the guide hole of the optical connector in the temporary assembly such that the alignment member aligns the stub device with the optical connector, the stub device having an end face and another end face, the end face being opposite to the another end face, the another end face of the stub device being optically coupled to the optical connector in the step of applying a magnetic force to the alignment member of the temporary assembly, and the magnet device including at least one of an electromagnet or a permanent magnet.

An optical connecting part according to another aspect of the present invention includes: at least one optical fiber; a guide member having an end, another end, and a hole extending in a direction from the end to the another end, the guide member including a magnetic body; and a holder having an end face, another end face, a first supporting portion supporting the optical fiber, and a second supporting portion supporting the guide member. The second support- ing portion extends in a direction from the end to the another end, and the another end of the guide member being disposed at the anther end.

An optical communication apparatus according to yet another aspect of the present invention includes a silicon photonics semiconductor device monolithically integrating an optical coupling element, and an optical element optically coupled to the optical coupling element; an optical connecting part including at least one optical fiber, a guide member having an end, another end, and a hole extending in a direction from the end to the another end, the guide member including a magnetic body, and a holder having an end face, another end face, a first supporting portion supporting the optical fiber, and a second supporting portion supporting the guide member, the second supporting portion extending in a direction from the end to the another end, and the another end of the guide member being disposed at the anther end, and the connecting part being optically coupled to the optical coupling element of the silicon photonics semiconductor device; and an adhesive member fixing the connecting part to the silicon photonics semiconductor device. The optical connecting part includes a stub device.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 8A is an elevation view schematically showing a product in a major step in the method according to the present embodiment, and FIG. 8B is a cross-sectional view schematically showing a product in a major step in the method according to the present embodiment.

FIG. 9A is an elevation view schematically showing a product in a major step in the method according to the present embodiment, and FIG. 9B is a schematic cross-sectional view, taken along IXb-IXb line shown in FIG. 9A, showing a product in a major step in the method according to the present embodiment.

FIG. 10A is an elevation view schematically showing a product in a major step in the method according to the present embodiment, and FIG. 10B is a schematic cross-sectional view, taken along Xb-Xb line shown in FIG. 10A, showing a product in a major step in the method according to the present embodiment.

FIG. 12A is an elevation view schematically showing a product in a major step in the method according to the present embodiment, and FIG. 12B is a cross-sectional view schematically showing a product in a major step in the method according to the present embodiment.

FIGS. 19A, 19B and 19C are views each showing a component for the optical connecting part according to the present embodiment.

DESCRIPTION OF THE PREFERRED EMBODIMENTS

Figure 1:
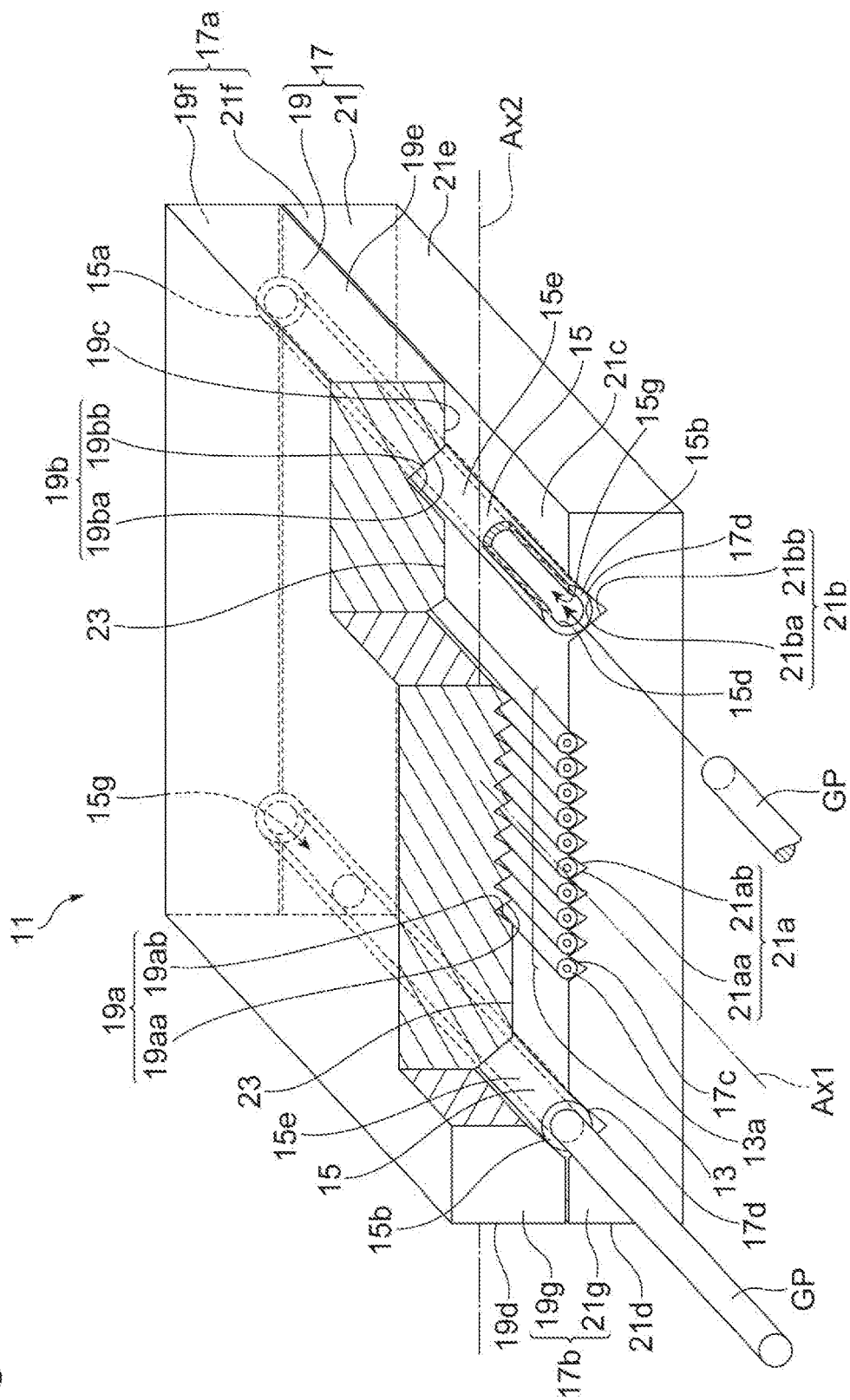
FIG. 1 is a perspective view schematically showing an optical connecting part according to the present embodiment.

In order to optically couple an optical waveguide for signal transmission with an optical device, such as a silicon photonics semiconductor device, an optical connecting part, such as a fiber stub, is needed. Prior to optically coupling the optical waveguide to the silicon photonics semiconductor device, the optical connecting part is bonded to the silicon photonics semiconductor device. The bonding includes the following processes. The optical connecting part is optically aligned with the silicon photonics semiconductor device. The optical alignment uses active alignment, and the active alignment requires the optical connecting part to be optically coupled to a device, such as an optical connector, which is connected to an optical source for optical alignment, thereby optically coupling the optical connecting part to the optical source.

Inventor's teachings reveal that stability in optical coupling between the optical connecting device and the optical connector relates to positional accuracy in the alignment and/or the time required for the alignment.

It is an object of one aspect of the present invention to provide a method for fabricating an optical communication apparatus which can provide a stable optical coupling in the fabrication thereof. It is an object of another aspect of the present invention to provide an optical connecting part allowing stable optical coupling. It is an object of still another aspect of the present invention to provide an optical communication device including an optical connecting part allowing stable optical coupling.

Specific embodiments according to the above aspects are described below.

One aspect according to an embodiment relates to a method for fabricating an optical transmitting apparatus, and the method includes steps of: preparing a temporary assembly including a stub device including at least one optical fiber, a guide member including a magnetic body with a hole, and a holder supporting the guide member and the optical fiber, an optical connector having one or more optical waveguides and a guide hole, and an alignment member having a magnetic body extending in a direction of an axis; preparing an optical device to be coupled to the temporary assembly; applying a magnetic force to the alignment member of the temporary assembly with a magnet device; carrying out optical alignment of one of the stub device and the optical device to the other by active alignment in which the temporary assembly is moved on the optical device, after applying the magnetic force to the alignment member; and separating the optical connector and the alignment member apart from the stub device, after the optical alignment. The alignment member is disposed in the hole of the stub device and the guide hole of the optical connector in the temporary assembly such that the alignment member aligns the stub device with the optical connector. The stub device has an end face and another end face, the end face being opposite to the another end face. The another end face of the stub device is optically coupled to the optical connector in the step of applying the magnetic force to the alignment member of the temporary assembly. The magnet device includes at least one of an electromagnet or a permanent magnet.

In the method of fabricating the optical communication apparatus, the alignment member is inserted from an end of the guide member of the stub device into the hole of the guide member through the guide hole of the optical connector. The application of a magnetic force to the alignment member in the temporary assembly with a magnet apparatus allows the magnetic coupling of the alignment member with the magnetic body of the guide member of the stub device in a magnetic field produced by the magnet apparatus. The magnetic coupling force acts, for example, between the magnetic body of the guide member and the alignment member passing through a hole of the guide member of the optical connector and between the magnetic body of the guide member and an end of the alignment member in the hole of the magnetic body of the guide member, thereby stabilizing the optical coupling between the optical connector and the optical connecting part (for example, the stub device). An optical device is prepared and is to be optically coupled to the temporary assembly, and the optical device and the stub device are optically aligned with each other. In the present step, the other end face of the optical connector is optically coupled to the optical connector, and the end of the stub device is optically coupled to the optical device.

In the method according to an embodiment, the guide member has an end disposed at the another end face of the stub device, and the alignment member has an end apart from the end face of the stub device in the hole of the guide member in the step of preparing a temporary assembly.

In the method of fabricating the optical communication apparatus, the end of the alignment member is disposed in the middle of the support portion supporting the guide member in the stub device. Magnetic field produced by the magnet apparatus runs in the alignment member and extends outward from the end of the alignment member to reach the magnetic body. The magnetic field produced by the magnet apparatus can generate a magnetic attraction between the end of the alignment member and the magnetic body of the guide member.

In the method according to an embodiment, the optical connector includes a magnetic member having a through-hole providing the guide hole, and the hole of the stub device extends from the another end face.

In the method of fabricating the optical communication device, the through-hole of the magnetic member of the pigtail-type optical connector receives the alignment member therein. A magnetic field from the magnet apparatus runs in not only the alignment member but also the guide member of the optical connector, and extends outward from the end of the guide member to reach the end of the guide member of the stub device. The magnetic field created by the magnet apparatus can generate a magnetic attraction between the magnetic body of the guide member of the optical connector and the magnetic body of the guide member of the stub device.

In the method according to an embodiment, the holder a first supporting portion supporting the optical fiber, and a second supporting portion supporting the guide member, the second supporting portion extending in a direction from the end face to the another end face, and the hole of the guide member terminates midway in the first supporting portion.

In the present method, the end of the alignment member is disposed in the middle of the first support portion according to the depth of the hole of the guide member.

Another aspect according to an embodiment relates to an optical connecting part, which includes at least one optical fiber; a guide member having an end, another end, and a hole extending in a direction from the end to the another end, the guide member including a magnetic body; and a holder having an end face, another end face, a first supporting portion supporting the optical fiber, and a second supporting portion supporting the guide member. The second supporting portion extends in a direction from the end to the another end, and the another end of the guide member being disposed at the anther end face.

In the optical connecting part, the holder of the optical connecting part supports the guide member. The guide member has a hole extending from the other end thereof, which is located at the other end face of the holder. The other end face of the holder of the optical connecting part can be optically coupled to an optical prat, which includes, for example, an optical connector or a fiber-stub. Further, the guide member is provided with the hole that has such a size as to allow the insertion of the alignment member comprising a magnetic material and that is defined by, for example, the inner surface of the guide member. The alignment member in the hole can apply a magnetic force directly to the magnetic body of the guide member of the optical connecting part. The direct magnetic coupling between the optical connecting part and an optical component can stabilize an optical coupling between the optical connecting part and the optical part. The optical connecting part has a structure effective in providing a magnetic force, which can maintain a stable optical coupling between the optical connecting part and an optical part, in response to an external magnetic field in optically aligning the semiconductor optical device, such as a silicon photonics device, with the optical connecting part.

In the optical connecting part according to an embodiment, the optical connecting part includes a pigtail type optical connector.

The present optical connecting part can be provided with a pigtail type optical connector.

In the optical connecting part according to an embodiment, optical connecting part includes a stub device.

The present optical connecting part can be provided with a stub-type device.

In the optical connecting part according to an embodiment, the guide member includes a stopper disposed between the end of the guide member and the another end of the guide member.

The present optical connecting part can prevent the adhesive member, which is applied to the end face of the stub device, from reaching the other end of the stub device through the hole of the guide member.

Yet another aspect according to an embodiment relates to an optical communication apparatus, which includes: a silicon photonics semiconductor device monolithically integrating an optical coupling element, and an optical element optically coupled to the optical coupling element; an optical connecting part, the optical connecting part being optically coupled to the optical coupling element of the silicon photonics semiconductor device; and an adhesive member fixing the connecting part to the silicon photonics semiconductor device. The optical connecting part includes a stub device.

The optical communication apparatus includes the stub device provided with a structure enabling a stable active optical alignment in forming an optical coupling between the silicon photonics device and the stub device.

The teachings of the present invention can be readily understood by considering the following detailed description with reference to the accompanying drawings shown as examples. Referring to the accompanying drawings, embodiments of an optical connecting part, an optical communication apparatus, and a method for fabricating an optical communication apparatus according to the aspects of the present invention will be illustrated below. When possible, the same portions will be denoted by the same reference numerals.

FIG. 1 is a schematic perspective view showing an optical connecting part according to the present embodiment. Referring to FIG. 1, the optical connecting part 11 includes one or more optical fibers 13, a guide member 15, and a holder 17. The optical connecting part 11 includes, for example, ten optical fibers 13, and the number of optical fibers 13 is not limited thereto. The optical fibers 13 may comprise, for example, quartz single mode optical fibers. Each optical fiber 13 has a core and a cladding surround the core. The guide member 15 includes a magnetic body, and can be a magnetic member having, for example, an end 15a, another end 15b, and the hole 15g. The hole 15g of the guide member 15 extends in the direction from one end 15a to the other end 15b. The other end 15b is opposite to the end 15a. The guide member 15 has an inner side 15d forming a hole 15g, and the inner side 15d is made of magnetic material. The hole 15g of the guide member 15 can receive the alignment member, such as, an alignment pin GP, and in the embodiment, the guide member 15 has an inner side 15d continuous from the end 15a to the other end 15b. The guide member 15 may include magnetic metal. Using the metal allows the guide member 15 to have a precise dimension. The holder 17 includes an end face 17a, another end face 17b, a first support portion 17c, and a second support portion 17d. The first support portion 17c supports an optical fiber, and the second support portion 17d supports the guide member 15. The first support portion 17c extends from the other end face 17b in the holder 17 in the direction from the end face 17a to the other end face 17b, and the other end 15b of the guide member 15 is located at the other end face 17b of the holder 17.

Figure 2B:
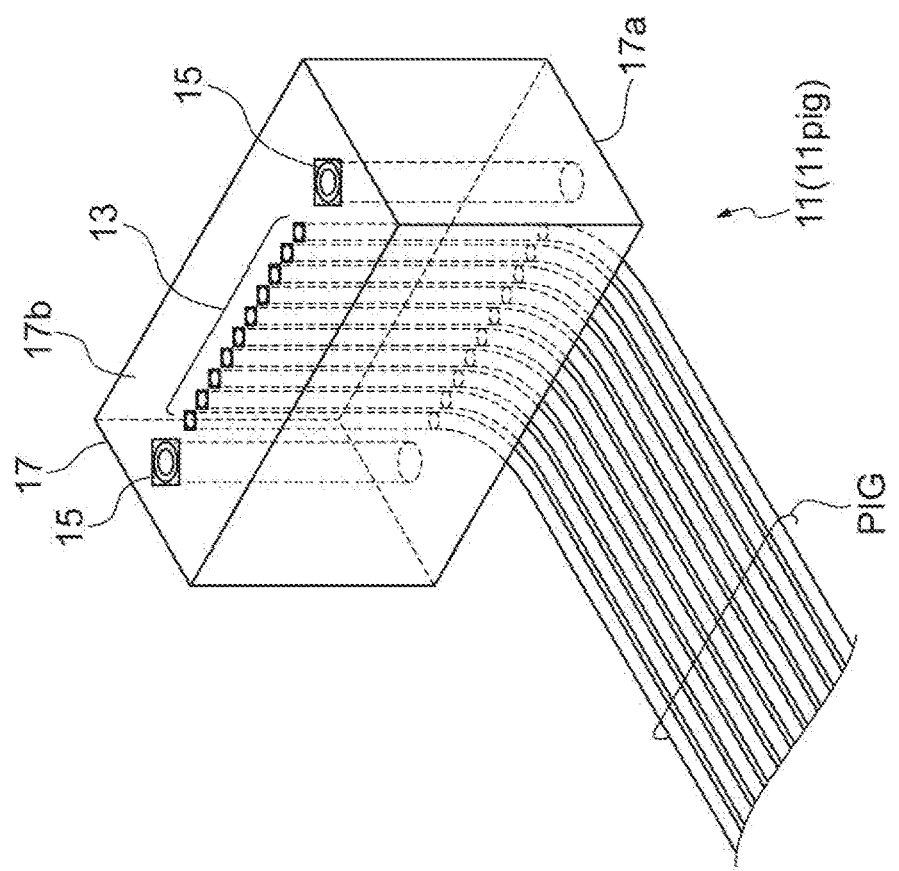
FIG. 2B is a view showing the appearance of another typical optical connecting part according to the present embodiment.
Figure 2A:
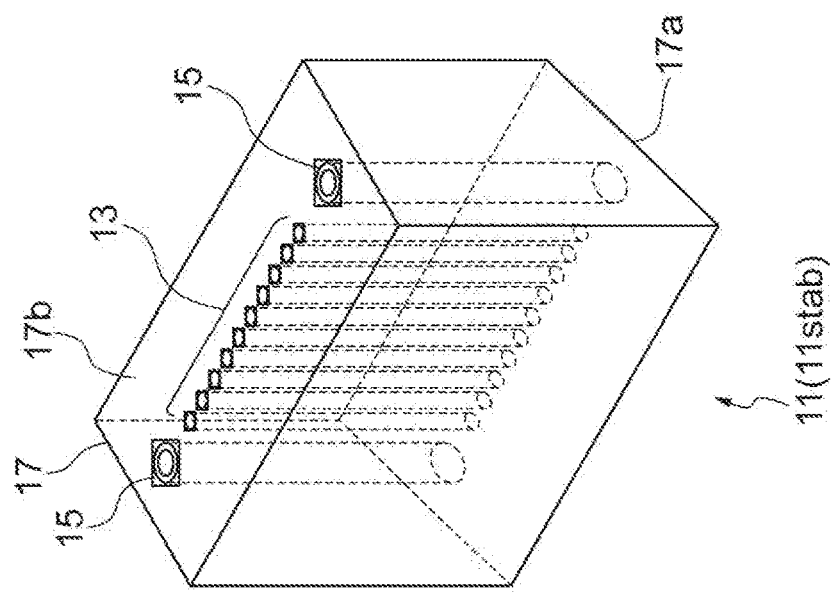
FIG. 2A is a view showing the appearance of a typical optical connecting part according to the present embodiment.

The optical connecting part 11 may comprise a stub-type device, or a pigtail-type optical connector. Specifically, FIGS. 2A and 2B are views illustrating the appearance of an exemplary optical device according to the present embodiment. The optical connecting part 11 shown in FIG. 2A is referred to as a stub device 11*stab*, and the relevant optical connecting part 11 has a stub structure. In this structure, the optical fiber 13 extends from the end face 17*a* of the holder 17 to the other end face 17*b*. Alternatively, the optical connecting part 11 shown in FIG. 2B is referred to as an optical connector device 11*pig*, and the optical connecting part 11 has a pigtail structure. The optical connecting part 11 may be provided with a pigtail fiber PIG extending outward from the end face 17*a* of the holder 17. In this structure, the optical fiber 13 includes a first portion extending in the holder 17, and a second portion extending outward from the end face 17*a* of the holder 17.

Figure 3:
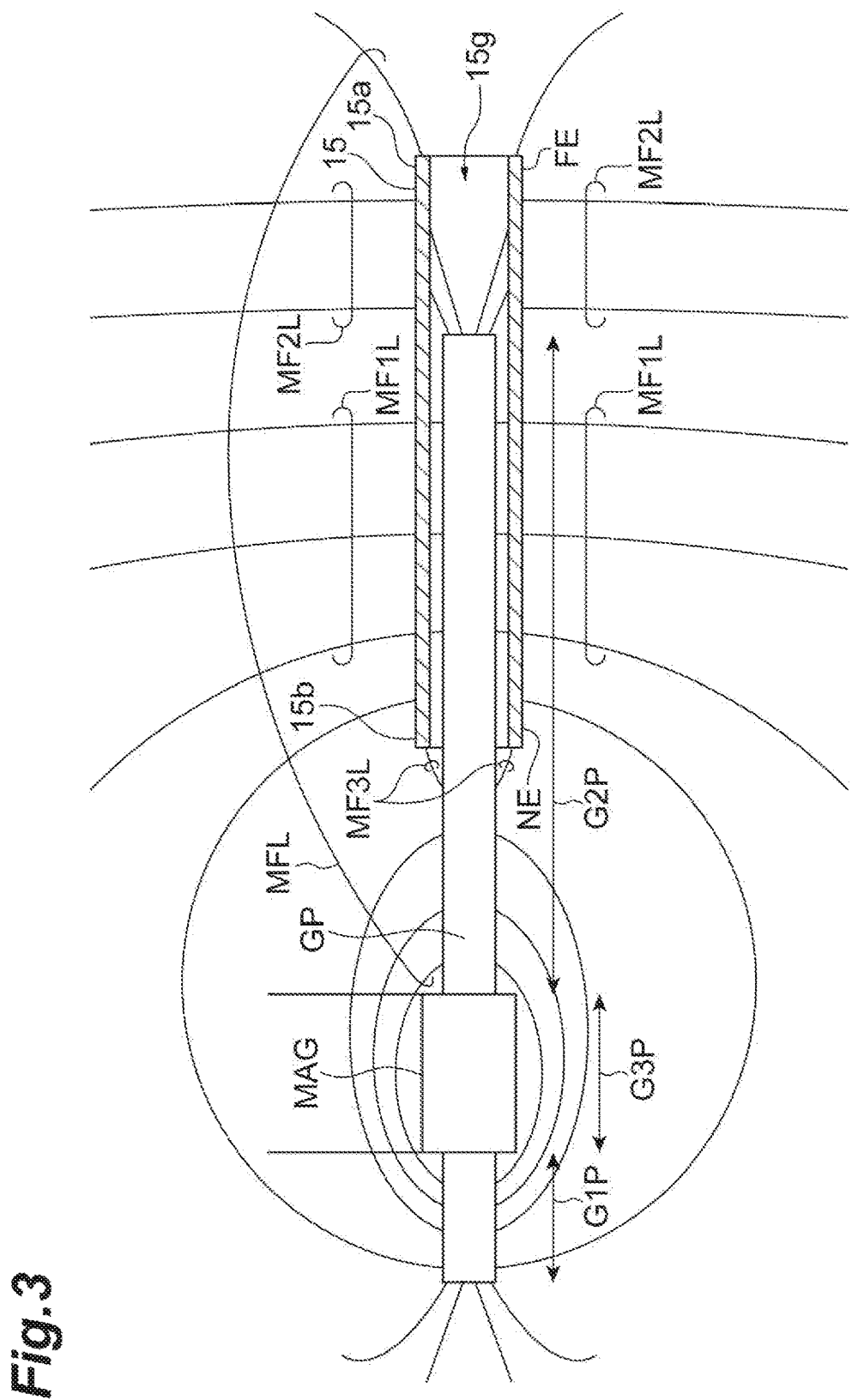
FIG. 3 is a view showing the arrangement of an alignment pin for an alignment member and a magnet apparatus, and the magnetic field thereon that magnet apparatus produces.

FIG. 3 is a schematic view showing the arrangement of the guide member 15 of the optical connecting part 11, an magnet apparatus MAG, and an alignment pin GP for the aligning member, and shows lines of magnetic force generated by the magnet apparatus MAG thereon. The magnet apparatus MAG includes at least one of a permanent magnet or an electromagnet. FIG. 3 draws lines of magnetic force MFL on the plane extending on the center axis of the guide member 15 and the alignment pins GP, and in order to show the alignment pin GP of magnetic material (e.g., nickel (Ni), stainless steel with magnetism, a cemented carbide which can provide the pin with a desired diameter and can adjust the solid solution amount of tungsten carbide (WC) in a nickel binder such that the entire cemented carbide still have magnetism) in the guide member 15 of magnetic material (e.g., nickel (Ni), and cobalt (Co)), the side walls of the guide member 15 shown in FIG. 3 is partially broken. The guide member 15 has a proximal end NE close to the magnet device MAG, and a distal end FE opposite to the proximal end NE. The alignment pin GP is inserted from the proximal end NE of the guide member 15 into the hole 15*g*, and the end of the alignment pin GP is located midway between the end 15*a* and the other end 15*b*. The alignment pin GP, which is magnetically coupled to the magnet device MAG, has a first portion G1P extending to one of the N and S poles of the magnet device MAG, a second portion G2P extending to the other, and a third part G3P, connecting the first portion G1P and the second portion G2P, that couples to the magnet device. In the present embodiment, the second part G2P is longer than the first part G1P.

The arrangement of the magnet device MAG, the guide member 15, and the alignment pin GP forms a magnetic field, which looks like a magnetic field of a single magnet in distant places, and the lines of magnetic force according to the magnetic field start from the N-pole thereof and reaches the S-pole to form a closed loop. In the magnetic field generated by the magnet device MAG, the guide member 15 and the alignment pin GP apply a magnetic force mutually. The lines of magnetic force, which travels in the second portion G2P, are curved outside the second portion G2P to return back to one of the N and S poles. The lines of magnetic field MF1L penetrate the side wall of the guide member 15 in order to come back to one of the N- and S-poles. Further, the lines of magnetic force MF2L in the alignment pins GP extend across the end face of the guide pin located in the hole 15*g* of the guide member 15 (one end of the alignment pin GP), and are bent so as to pass through the side wall of the guide member 15 back to one of N- and S-pole thereof. Such lines of magnetic field generate a magnetic attractive force between the alignment pin GP and the side wall of the guide member 15. In addition, the lines of magnetic force MF3L traveling in the second portion G2P are curved in the vicinity of the near end NE of the guide member 15 to pass across the side of the alignment pins GP, and some of the lines of magnetic field MF3L enter the magnetic body of the guide member 15 at the proximal end thereof. The shape of the lines of magnetic field enables the magnetic attraction between the alignment pins GP and the proximal end NE of the guide member 15.

Referring again to FIG. 1, in the optical connecting part 11, the guide member 15 has a hole 15*g* extending from the other end 15*b* to the end 15*a*, and the other end 15*b* of the guide member 15 is positioned at the other end face 17*b* of the holder 17. The hole 15*g* of the guide member 15 is provided such that the alignment member (e.g., alignment pin GP for alignment) can be inserted thereinto, and the alignment pin GP in the hole 15*g* can be magnetically coupled to the magnetic body of the guide member 15 to apply magnetic force thereto.

The other end face 17*b* of the optical connecting part 11 can be formed to be optically coupled to an optical component, such as an optical connectors or a fiber stub. The hole 15*g* is provided to be able to receive the alignment pin GP of a magnetic member therein, and is defined by the inner face of the guide member 15, and the inner face comprises, for example, magnetic material. The magnetic member of the alignment pin GP in the hole 15*g* is directly coupled to the magnetic body of the guide member 15 by magnetic force.

If possible, the optical connector device 11*pig* shown in FIG. 2B can be used as an optical part. The optical connector device 11*pig* may include a magnetic member, which serves as the guide member 15, and has one end, another end, a hole extending from the end to the other end.

The guide member 15 of the stub device 11*stab* and the magnetic body of the guide member 15 in the optical connector device 11*pig* are directly coupled to apply magnetic force through an alignment pin GP mutually. The direct magnetic coupling between the guide member 15 of the optical connector device 11*pig* and the guide member 15 of the stub device 11*stab* enables a stable optical coupling between the two optical connecting parts. The action of the magnetic field created by the magnet apparatus MAG allows the optical alignment of the optical connecting part 11 with the semiconductor optical device, such as a silicon photonics semiconductor device, with a stable optical coupling between the two optical connecting parts being maintained.

Figure 4:
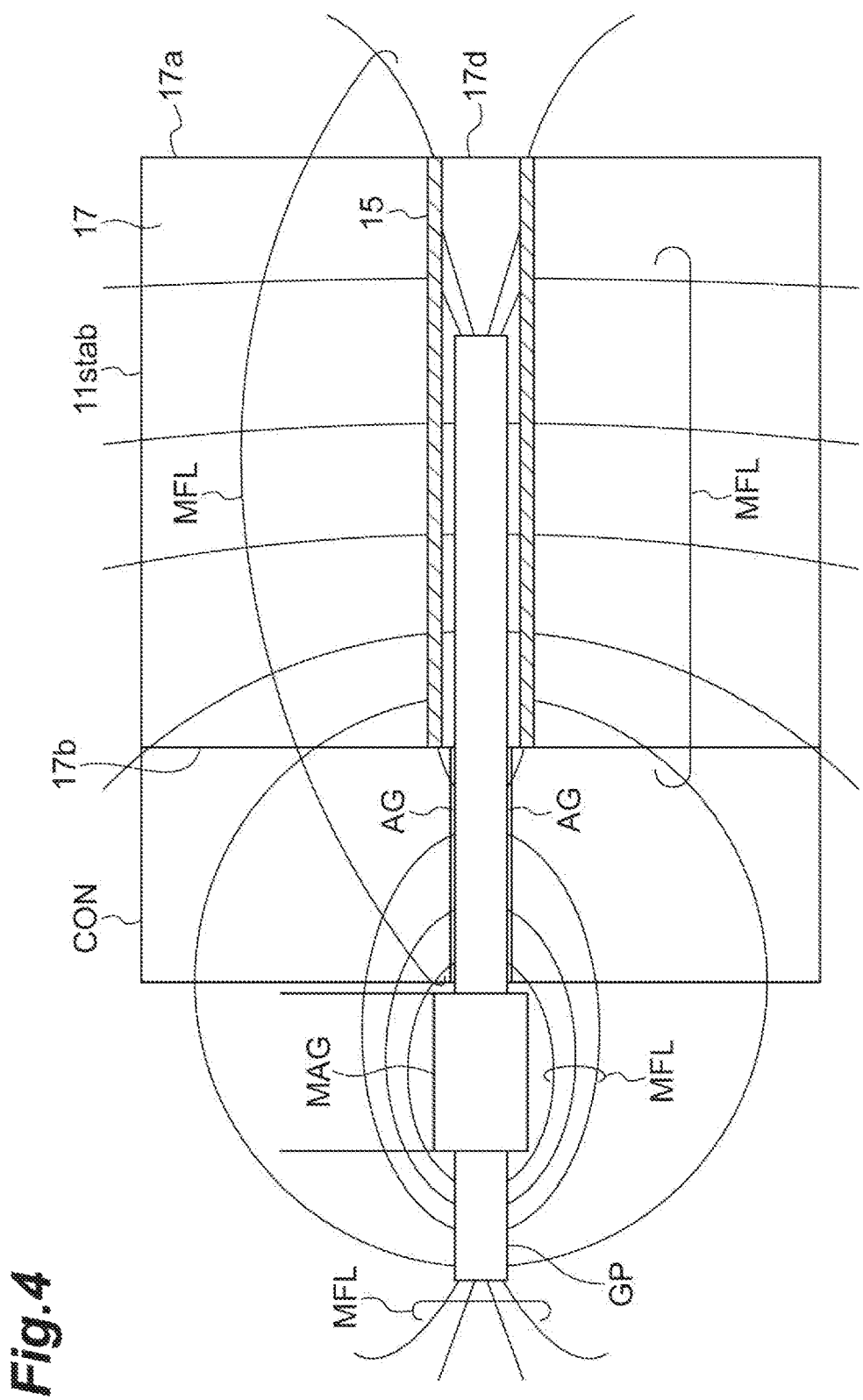
FIG. 4 is a schematic view showing a stub device and a pigtail type optical connector, which are coupled to each other, according to the present embodiment.

FIG. 4 is a schematic view showing a connection configuration of a stub device 11*stab* and a pigtail-type optical connector. In FIG. 4, the guide member 15 of the optical connecting part 11, the alignment pin GP, the magnet apparatus MAG and magnetic force lines MFL, which are shown in FIG. 3, are drawn together with the holder 17 of the optical connecting part 11 and the pigtail type optical connector CON. The optical connector CON has an optical waveguide structure which allows the optical connecting part 11 to optically couple therewith. The alignment pin GP is attached to the optical connector CON so as to be firmly held by the optical connector CON, and this attaching can be realized by, for example, fixing using an adhesive. The structure allows a stable optical coupling of the optical connector CON to the stub device 11*stab* through a magnetic force working between the alignment pin GP in which the magnetic lines MFL run, and the guide member 15 receiving the magnetic force from the alignment pin GP. Making the magnitude of the magnetic field from the magnet device MAG zero or small can remove the stub device 11*stab* from the alignment pin GP. The magnetic field of the magnet apparatus MAG allows a magnetic force to act on the guide member 15 comprising a magnetic material and the alignment pin GP comprising a magnetic material, and the magnetic force enables a stable optical coupling between the optical connector CON and the stub device 11*stab*.

The optical connector device 11*pig* shown in FIG. 2B can be used instead of the optical connector CON. As seen from the description of the guide member 15 of the stub devices 11*stab*, the guide member 15 of the optical connector device 11*pig* receives magnetic field lines from the alignment pins GP. The alignment pin GP allows the optical connector device 11*pig* of the guide member 15 and the stub device 11*stab* of the guide member 15, together, to receive the magnetic field lines therefrom, so that the guide member 15 the optical connector device 11*pig* and the guide member 15 of the stub device 11*stab* exert magnetic force on each other to attract mutually. This attractive force can provide the stub device 11*stab* with a further stable optical coupling. Making the magnetic field from the magnet apparatus MAG zero or small can remove the stub device 11*stab* from the alignment pin GP and optical connector device 11*pig* easily.

Figure 5A:
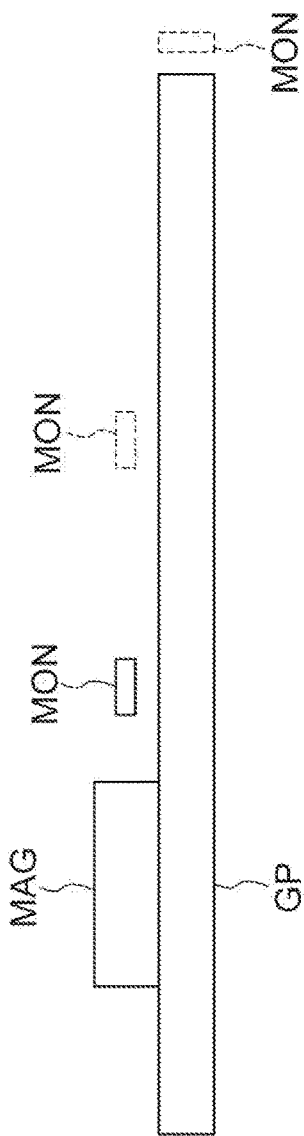
FIG. 5A is a view showing a measurement apparatus for measuring leakage of the magnetic field.
Figure 5B:
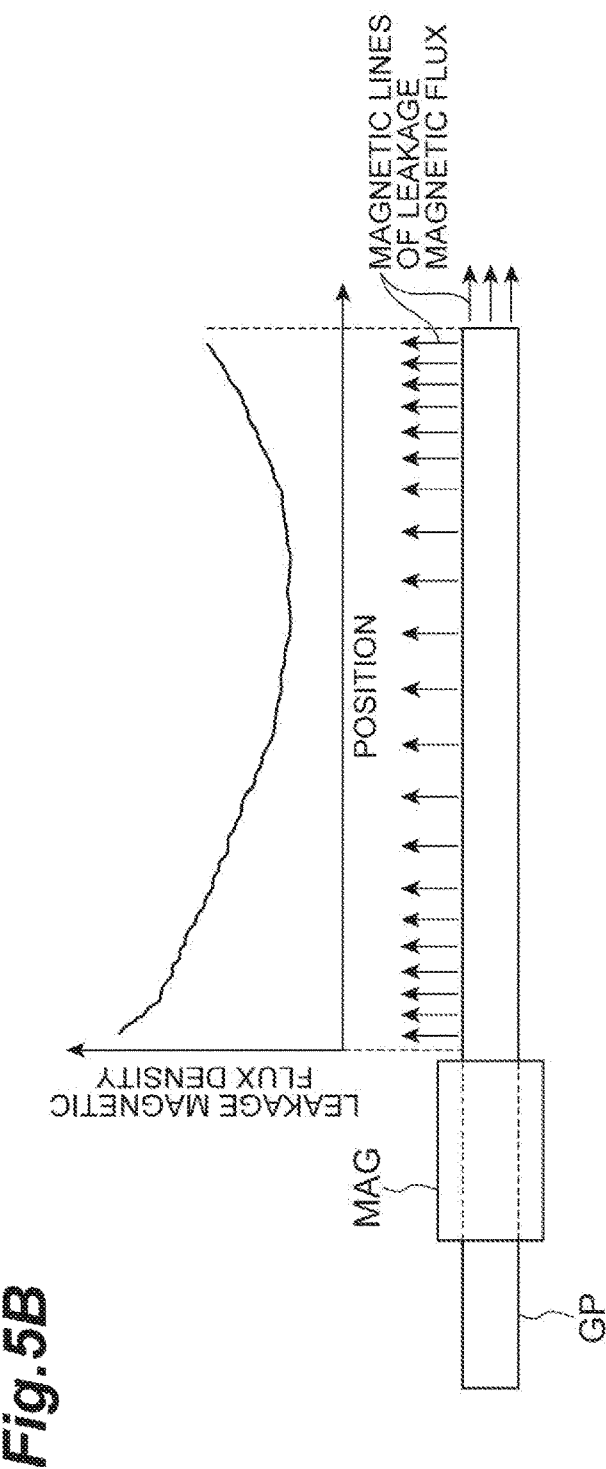
FIG. 5B is a view showing a leakage of the magnetic field, which is shown in the solid lines, from the side of the guide pin of the optical connecting part according to the present embodiment.

FIGS. 5A and 5B are views each showing leakage magnetic field lines of the side of the shaft-shaped alignment pin. As shown in FIG. 5A, the magnet apparatus MAG is magnetically coupled with the alignment pin GP of magnetic material so that magnetic force on the side of a guide pin is estimated with a monitoring magnet piece MON, and FIG. 5B schematically shows the relationship between the monitoring coordinates on the extension axis of the guide pin and the relative strength of the leakage magnetic flux density. As shown in FIG. 5B, the change in the density of arrows reveals that the magnitude of the leakage magnetic flux density on the side of the alignment pin decrease with the distance from the magnet apparatus MAG to become the minimum, and then increase from the minimum value as approaching the end of the guide pin. The magnitude of the magnetic force relates to the attractive force between the alignment pin GP and the guide member 15. In the arrangement in which the end of the alignment pin GP is located in the middle of the guide member 15, a magnetic interaction between the alignment pin GP and the guide member 15 is made large around the end portion of the alignment pin GP. The teachings from FIGS. 5A and 5B reveal that positioning the end of the alignment pin GP at any position from the end 15*a* to the other end 15*b*, and that as shown in FIG. 4, the end of the alignment pin GP is located, for example, midway of the hole 15*g* of the guide member 15.

Figure 6:
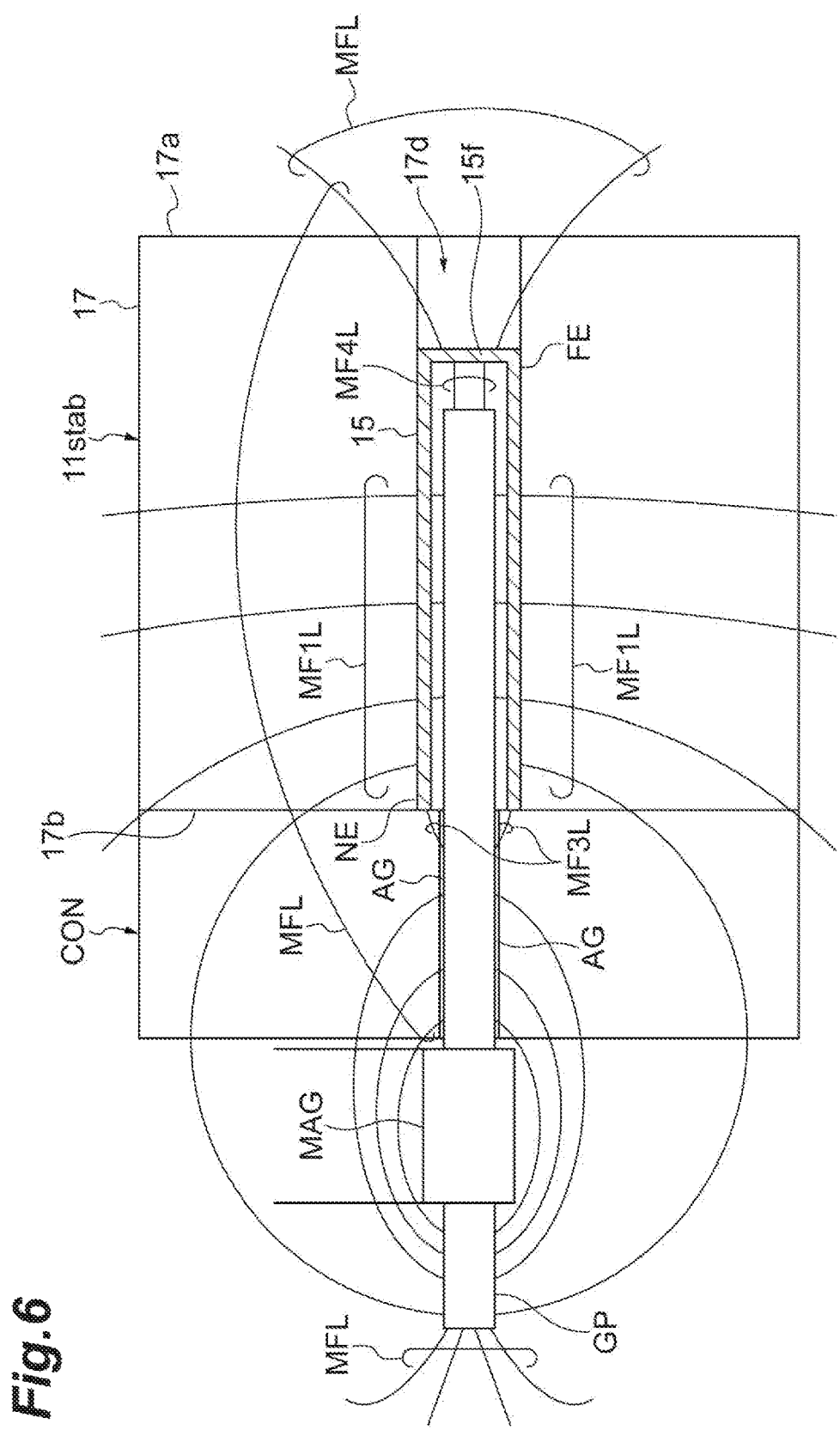
FIG. 6 is a schematic view showing the optical connecting part, which is attached to the magnet apparatus, according to the present embodiment.

As shown in FIG. 6, the guide member 15 may include a stopper 15*f* provided in the hole 15*g* at any position from the one end 15*a* of the guide member 15 to the other end 15*b*. In the present embodiment, the stopper 15*f* is provided on an end of the guide member 15. The stub device 11*stab* of this type can prevent an adhesive member applied to the one end face 17*a* of the holder 17 from reaching the other end face 17*b* of the stub device 11*stab* via the holes 15*g* of the guide member 15. Moreover, with reference to the magnetic field lines MF4L shown in FIG. 6, the magnetic force lines from the end of the alignment pins GP reaches the stopper 15*f*, and forms a magnetic coupling, which generates a magnetic attractive force between the stopper 15*f* and the end of the alignment pin GP.

Referring again to FIG. 1, the holder 17 includes a first member 19 and second member 21. The optical fiber 13 and the guide member 15 are disposed between the first member 19 and the second member 21, and the holder 17 includes the adhesive member 23 that bonds the first member 19 and second member 21 to each other. The ends 13*a* of the optical fibers 13 are positioned at the other end face 17*b*. Each optical fiber 13 is supported by the first supporting portion 17*c* of the holder 17 so as to extend from the other end face 17*b* toward the end face 17*a*. The first support portion 17*c* preferably has at least three faces for the support. In the present embodiment, the first support portion 19*a* of the first member 19 has a first side 19*aa* and a second side 19*ab* for supporting the optical fiber 13. The first side 19*aa* and the second side 19*ab* of the guide portion 19*a* of the first member 19 are in direct contact with the side of the optical fiber 13 at respective parts thereof, and are in contact with the adhesive member 23 to support the side of the optical fiber 13 through the adhesive member 23 in other parts thereof. The second support portion 21*a* of the second member 21 also has a first side 21*aa* and a second side 21*ab* for supporting the optical fiber 13. The first side 21*aa* and the second side 21*ab* of the guide portion 21*a* in the second member 21 are in direct contact with the side of the optical fiber 13 at respective parts thereof, and are in contact with the adhesive member 23 to support the side of the optical fiber 13 at other parts thereof through the adhesive member 23.

The second support portion 17*d* supports the guide member 15 extending from the other end face 17*b* toward the end face 17*a*. In the present embodiment, the second support portion 17*d* is in contact with the side of the guide pipe at parts thereof so as to support the side 15*e* of the guide member 15. In order to enable the support, the second support portion 17*d* preferably has at least three faces. In the present embodiment, the guide portion 19*b* of the first member 19 has a first side 19*ba* and second side 19*bb* for supporting the guide member 15. The first side 19*ba* and the second side 19*bb* of the guide portion 19*b* in the first member 19 are in direct contact with the guide pipe at parts thereof, and are in contact with the adhesive member 23 to support the side of the guide member 15 at other part thereof via the adhesive member 23. Further, in the present embodiment, the guide portion 21*b* of the second member 21 has a first side 21*ba* and a second side 21*bb* for supporting the guide member 15. The first side 21*ba* and the second side 21*bb* of the guide portion 21*b* of the second member 21 are in contact with the side of the guide pipe in parts thereof, and are in contact with the adhesive member 23 at other parts thereof to support the sides of the guide member 15 through the adhesive member 23.

In the above optical connecting part 11, the optical fiber 13 is bonded to the holder 17 by the adhesive member 23. The optical fiber 13 is supported by the first support portion 17*c* formed between the first member 19 and the second member 21, and is secured to the holder 17 by the adhesive member 23. The guide member 15 is located between the first member 19 and the second member 21, and is secured to the second support portion 17*d* of the holder 17 by the adhesive member 23. In inserting a guide or alignment pin into the second support portion 17*d*, the guide member 15 in the second support portion 17*d* can prevent the above-mentioned adhesive member 23 from interfering with the insertion of the pin.

The first member 19 has an adhesive surface 19*c* to which the adhesive member 23 is to be applied. In the present embodiment, the first support portion 19*a* and the guide portion 19*b* is provided on the adhesive surface 19*c*. The second member 21 also has an adhesive surface 21*c* to which the adhesive member 23 is to be applied. In the present embodiment, the adhesive surface 19*c* extends from one of the side 19*d* and the other side 19*e* of the first member 19 to the other, and reaches the first end face 19*g* of the first member 19 and may reach the end face 19*f*. The second supporting portion 21*a* and the guide portion 21*b* are provided on the adhesive surface 21c. In the present embodiment, the adhesive surface 21c extends from one of the side 21d and the other side 21e of the second member 21 to the other, and reaches the first end face 21g of the second member 21 and may reach the second end face 21f.

In the present embodiment, the optical fiber 13 and the guide member 15 extend in the first direction Ax1, and in order to enable this extension, the optical fiber 13 and the guide member 15 can be disposed between the first member 19 and second member 21 that are arranged in a direction crossing both the first direction Ax1 and the second direction Ax2, thereby holding the optical fiber 13 and the guide member 15. In order to enable the holding, the first member 19 has the first supporting portion 19a and the guide portion 19b provided on the adhesive surface 19c extending in the second direction Ax2 intersecting the first direction Ax1, and the second member 21 has a second supporting portion 21a and a guide portion 21b provided on the adhesive surface 21c extending in the second direction Ax2. The adhesive member 23 extends between the adhesive surface 19c and the adhesive surface 21c to firmly fix the first member 19 and the second member 21 with one another. The optical fiber 13 and the guide member 15 are supported by the first supporting portion 19a and the guide portion 19b, respectively, and are securely held by the holder 17 including the first member 19 and the second member 21. The side face of the guide member 15 can prevent the adhesive from rising up in the hole 15g. The end 15b of the guide member 15 is disposed at the other end face 17b.

The optical fiber 13 may include, for example, a quartz single mode optical fiber. The first member 19 and the second member 21 are made of, for example, glass, such as Tempax glass. The glass material can provide the first member 19 and the second member 21 with a highly precise dimension.

FIGS. 7A to 7D are views each showing an exemplary method for fabricating a guide member for the optical connecting part. The fabricating method illustrated uses an electroforming method. A metal core member is prepared therefor, and has a diameter corresponding to the diameter of the guide pin. Such a metal core member is produced by, for example, NC machining. Tolerance in the diameter of the metal core member thus prepared is, for example, −0.5 to 0.5 micrometers. The metal core member may be, for example, nickel, copper, stainless steel, cemented carbide.

Figure 7A:
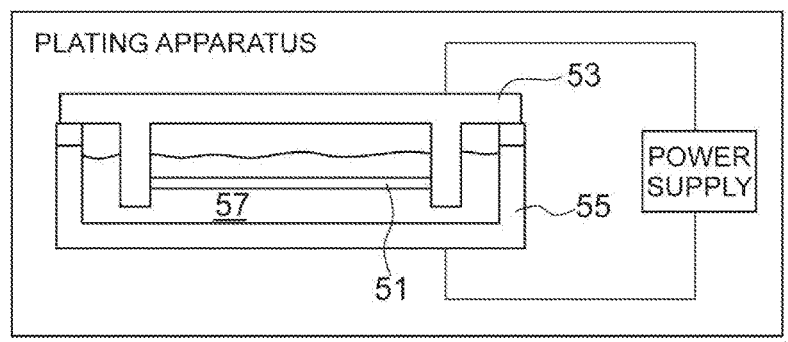
FIGS. 7A to 7D are views each showing a major step in an exemplary method for fabricating a guide member for an optical connecting part according to the present embodiment.
Figure 7B:
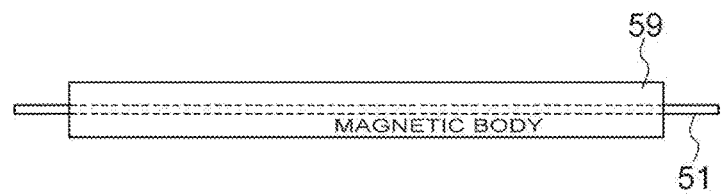
Figure 7C:
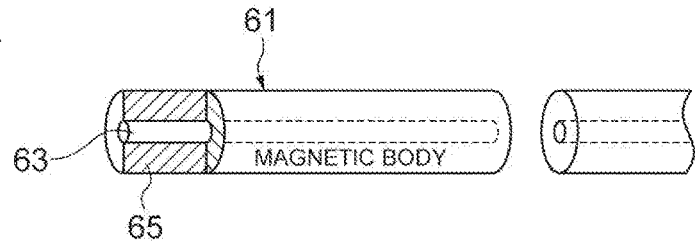
Figure 7D:
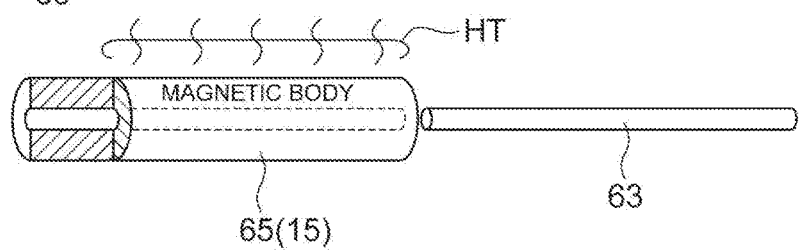

In the present embodiment, a film comprising a nickel of magnetic material is deposited on the side of the cemented carbide of the metallic core member to produce a tube made of nickel. In the electroforming method, the metal core member 51 thus prepared, as shown in FIG. 7A, is attached to the jig 53. The jig 53 and the metal core member 51 thus attached to the jig 53 are immersed in the electrolyte 57 in the electrolytic cell 55. The electrolyte 57 for a magnetic material deposition may be, for example, nickel sulfamate. In electroplating method, while precisely controlling the amount of charge supplied to the electrolytic solution 57, a metal is deposited on the metal core member 51 by electroplating. Controlling the amount of charge allows the accurate control of the thickness of metal deposition on the side of the metal core member 51, thereby fabricating, as shown in FIG. 7B, the metal core member 51 and a deposited metal wall 59 formed thereon. Magnetic material of the deposited metal wall 59 may be, for example, nickel (Ni) or cobalt (Co). The deposited metal wall 59 includes a metal film with the desired thickness formed on the side of the metal core member 51. Then, as shown in FIG. 7C, the metal core member 51 and the deposited metal wall 59 are cut together to a desired length to form an intermediate product 61. The intermediate product 61 includes a core member 63, and a cylindrical metal wall formed on the side of the core member 63. Heating TH of the intermediate product 61 can raise the temperature thereof to a temperature enough to utilize the difference in thermal expansion, so that as shown in FIG. 7D, the core member 63 can be removed from the intermediate product 61 to obtain the metal tube, i.e., a cylindrical part (65) of metallic magnetic. Tolerance of the outer diameter of the cylindrical part is, for example, −0.5 to +0.5 micrometers. Tolerance of the outer diameter of the tubular part depends upon the degree of precise control of the amount of charge supplied to the electrolytic solution.

In the optical connecting part that uses a single mode fiber (SMF) as the optical fiber 13, the single mode fiber has a mode field diameter of, for example, 7 to 8 micrometers. Preferably, a positional accuracy of the optical fiber 13 positioned in the first supporting portion 17c of the first support holder 17 in the optical connecting parts 11 is −1.0 to +1.0 micrometers, which allows the reduction in the optical connection loss between the optical connecting part 11 and an optical waveguide or an optical device of the optical part optically coupled to the optical connecting part 11. In addition, preferably, a positional accuracy of the guide member 15 positioned in the second support portion 17d is −1.0 to +1.0 micrometers. The support groove for this guide member is provided in place of the support groove of the guide pin, and the guide member 15 is disposed in a support groove of the guide member 15 in place of the guide pin. The use of the guide member 15 increases the number of parts for the optical connecting part 11. The inventor's estimate reveals that, even in consideration of increase in the number of parts, the optical connecting part 11 using the guide member 15 and the second support portion 17d for the guide member 15 can reduce optical loss in optical connection with the optical connecting part 11 as compared to a device including the guide pin and the supporting groove for the guide pin, and can reduce the loss to a desired range.

In the optical connecting part 11, regardless of the quantity of the adhesive, the addition of the guide member 15 can prevent the adhesion of the adhesive member 23 to a portion where the guide pin is to be inserted (the hole 15g of the guide member 15). The optical connecting part 11 prevents force in inserting the guide pin into the guide member 15 from being applied directly to the first member 19 and/or the second member 21 and from concentrating on the first member 19 and/or the second member 21, and the force is applied to the guide member 15 (e.g., a metal guide tube), which can be dispersed through the guide member 15, and finally, the force thus dispersed is applied to the first member 19 and/or the second member 21. The guide member 15 into which the guide pin is inserted can reduce the occurrence of cracks in the first member 19 and/or the second member 21, which are formed of a material exhibiting brittle like glass material. Specifically, the second supporting portion 17d which supports the guide member 15 is formed, for example, to have a V-shaped groove. Cracks are likely to originate from the depression, such as the bottom of the wedge-shaped V-groove.

With reference to FIGS. 8A, 8B, 9A, 9B, 10A, 10B, 11,12A, 12B, and 13, the method for fabricating an optical device will be described below. As shown in the front view of FIG. 8A, a metal tube 65 comprises a magnetic material, an optical fiber part 67, and a first part 69 and a second part 71 for the holder are prepared. In the present embodiment, the optical fiber part 67 includes a plurality of optical fibers, and the first part 69 and the second part 71, as shown in the plan view of FIG. 8B, have the same shape. For making the description simple, the first part 69 will be described below, and in the subsequent description on the first part 69, terms associated with the first part 69 are followed by reference numbers of parts, associated with the second part 71 corresponding thereto, in the parentheses written behind the first part 69. The first part 69 (second part 71) has a first adhesive surface 69c (71c) for receiving an adhesive. In the present embodiment, the first support groove 69a (71a) and the first guide groove 69b (71b) are provided on the first adhesive surface 69c (71c). The first adhesive surface 69c (71c) extends from one of the side 69d (71d) and the other side 69e (71e) of the first part 69 (71) to the other and reaches the end face 69f (the second end face 71f), and, if needed, may also reach the first end face 69g (the second end face 71g).

The first support groove 69a (the second support groove 71a) extends from the first end face 69g (the second end face 71g) towards the first end face 69f (the first end face 71f) so as to support the optical fiber part 67. For enabling the support, preferably, the first support groove 69a and the second support groove 71a have at least three faces in total, in the present embodiment, four faces. In the present embodiment, the first support groove 69a (71a) has a first side face 69aa (71aa) and a second side face 69ab (71ab) for supporting an optical fiber. Further, in the present embodiment, when the optical fiber part 67 is placed in the first support groove 69a and the second support groove 71a, the first side face 69aa (71aa) and the second side face 69ab (71ab) are in contact with the side of the optical fiber so as to support the optical fiber.

The first guide groove 69b (the second guide groove 71b) extends from the second end face 69g (the second end face 71g) towards the first end face 69f (the first end face 71f) to support the metal tube 65. The metal cylinder 65 is placed in the first guide groove 69b (71b), and the first guide groove 69b (71b) supports the metal tube 65. For enabling the support, preferably, the first guide groove 69b and the second guide groove 71b have at least three faces in total, in the present embodiment, four faces. More specifically, the first guide groove 69b (71b) has a first side 69ba (71ba) and a second side 69bb (71bb) for supporting a metal tube 65. The first side 69ba (71ba) and the second side 69bb (71bb) of the first guide groove 69b (71b) of the first part 69 (71) support the side face of the metal tube 65 in this example.

The metal tube 65, the optical fiber part 67, the first part 69 and the second part 71 are prepared, and as shown in FIG. 8A, the metal tube 65 and the optical fiber part 67 are positioned with respect to either the first part 69 or the second part 71, in the present embodiment the second part 71, and after positioning the above members, the first part 69 is positioned. The minimum value of the distance between the first part 69 and the second part 71 is preferably about 1 to 2 micrometers, so that before and after the positioning, the first part 69 and the second part 71 are not in contact with each other. The end of the metal tube 65 and the end of the optical fiber part 67 may protrude from the end faces of the first part 69 and the second part 71 by 0.02 to 0.3 mm. The protrusion of the metal tube 65 can prevent the applied adhesive from flowing into the hole of the metal tube 65 in applying adhesive to the first part 69 and second part 71.

As shown in the front view of FIG. 9A, the metal tube 65 and the optical fiber part 67 are sandwiched by the first part 69 and the second part 71, and the adhesive 73 is interposed between the first adhesive face 69c of the first part 69 and the second adhesive face 71c of the second part 71. The adhesive 73 is applied over, for example, from the outside of one of the second guide grooves 71b on the second adhesive face 71c of the second part 71 via the second support grooves 71a, which are provided between both of the second guide groove 71b, to the outside of the other of the second guide grooves 71b. The adhesive 73 is in contact with the side of the optical fiber part 67 in the first support groove 69a and the second support groove 71a and is in contact with the side of the metal cylinder 65 in the second guide groove 71a and the second guide groove 71b, and the adhesive 73 solidified makes it possible to fix the optical fiber part 67 and the metal tube 65 to the first support groove 69a (71a) and the first guide groove 69b (71b), respectively. After the above positioning has been completed, the adhesive 73 is cured. This curing forms an assembly 75. The assembly 75 forms an integrated object in which the metal tube 65 and the optical fiber part 67 is held between the first part 69 and the second part 71. As an example, a liquid adhesive 73 can be supplied to the gap between the first part 69 and the second part 71 by a capillary phenomenon. The liquid adhesive 73 is fed by the action of surface tension to the gap between the first part 69 and the second part 71 to complete the application of the adhesive 73. The adhesive 73 may be made of resin, such as, thermosetting or ultraviolet-curable epoxy adhesive. From the viewpoint of fixing process, the resin is exposed with UV light for curing for a short time to form a temporary fixing part, and then the temporary fixing part is subjected to thermal curing for actual fixing.

FIG. 9B is a cross-section taken along the IXb-IXb line shown in FIG. 9A. For example, in positioning the metal tube 65 and the optical fiber parts 67 to the second part 71, the metal tube 65 and the optical fiber part 67 have first respective surpluses each extending outwardly from the first end face 71f of the second part 71, and second respective surpluses extending outwardly from the second end surface 71g of the second part 71.

As shown in FIG. 10A, the polishing of the end face of the assembly 75 with the polishing member 77 provides a polished face with the assembly 75. This polishing can form the other end face 17b for an optical device. FIG. 10B is s a cross sectional view taken along the line Xb-Xb shown in FIG. 10A. In the present embodiment, the other end face 17b, the end portion of the metal tube 65b and the end portion of the optical fiber part 67 are positioned to each other, and the end of the metal tube 65 and the end of the optical fiber part 67 are aligned with each other at the other end face 17b. The end of the metal tube 65 has an end face polished, and the end of the optical fiber part 67 has an end face polished. The other end face 17b of the holder part (polished surface) encircles the end face of the metal tube 65 and the end face of the optical fiber part 67.

Figure 11:
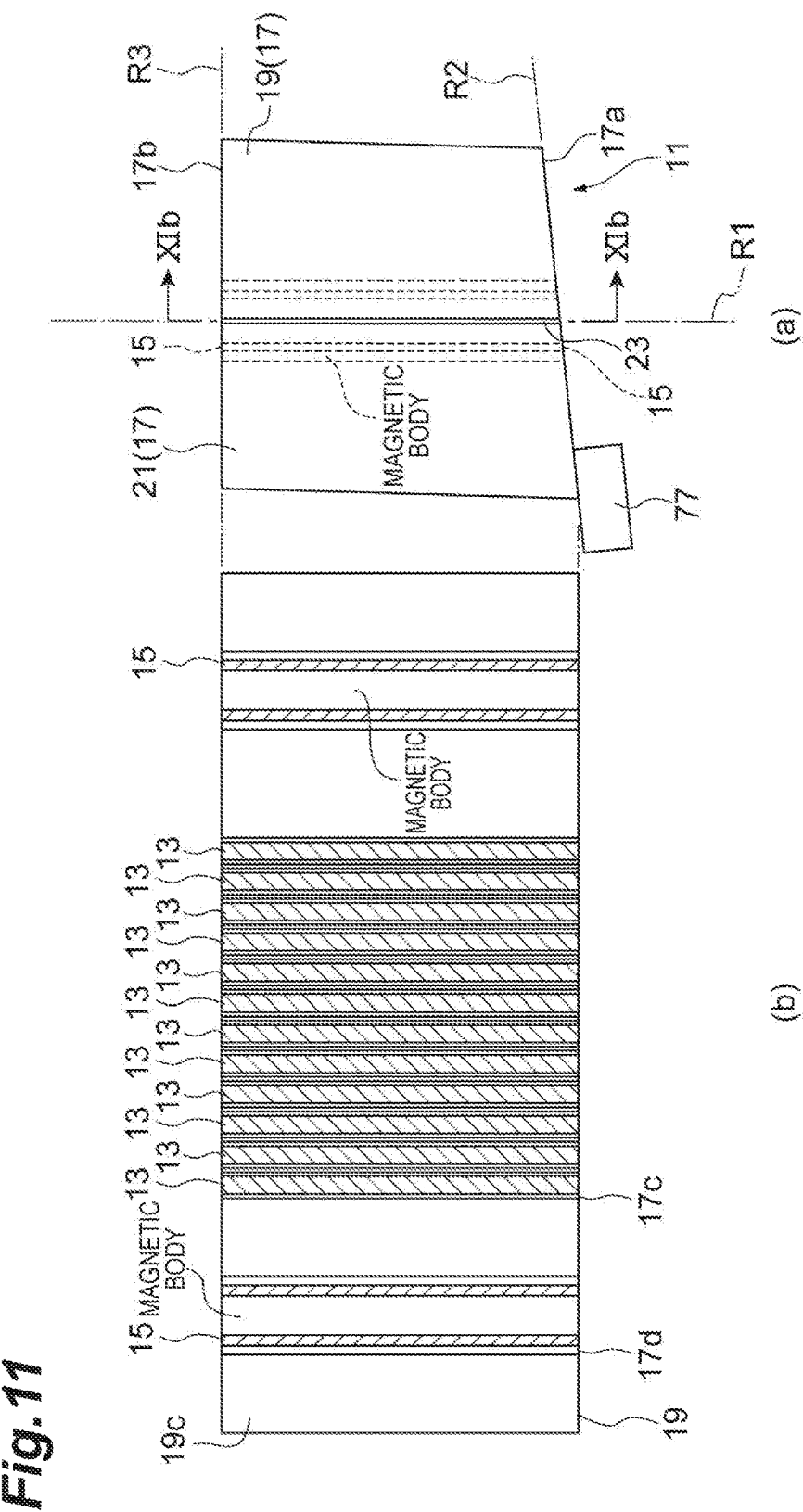
FIG. 11 is a schematic view showing a product in a major step in the method according to the present embodiment.

In the method for fabricating a stub structure, subsequently, as shown in FIG. 11, the other end face of the assembly 75 is polished with the polishing member 77 to form another polishing face in the assembly 75. This polishing forms the end face 17a in the optical connecting part 11. FIG. 11 shows a cross sectional view taken along the XIb-XIb line shown in part (a) of FIG. 11. In the present embodiment, the end of the optical fiber 13 and the end of the guide member 15 are positioned at each of the end face 17a and the other end face 17b, and both original ends of the metal tube 65 and both original ends of the optical fiber part 67 are removed by polishing to form the end and the other end of the optical fiber 13 and the end and the other end of the guide member 15. In the stub structure, the end of the optical fiber 13 and the end of the guide member 15 are aligned with each other at the end face 17a, and the other end of the optical fiber 13 and the other end of the guide member 15 are aligned with each other at the other end surface 17b.

The end face 17a of the holder part (polished surface) encircles the end face of the guide member 15 and the end face of the optical fiber 13. In the present embodiment, the guide member 15 and the optical fiber 13 are arranged along a first reference plane R1. The end face 17a extends along a second reference plane R2 inclined with respect to a plane perpendicular to the first reference plane R1, and the other end face 17b extends along a third reference plane R3 perpendicular to the first reference plane R1. The inclination angle of the end face 17a is, for example, about 8 degrees.

In the method for fabricating a pigtail structure, the polishing for the other end faces 17b substantially completes process in fabricating the optical connecting part, as shown in FIG. 12A, to provide the optical connecting part having a pigtail structure 11. FIG. 12B is a cross sectional view taken along the XIIb-XIIb line shown in FIG. 12A. In the present embodiment, the length and positioning of the metal tube 65 are determined in accordance with the length of the guide member 15. The preliminary positioning (positioning of the metal tube 65) can prevent the guide member 15 from protruding from the end face 17a.

Figure 13:
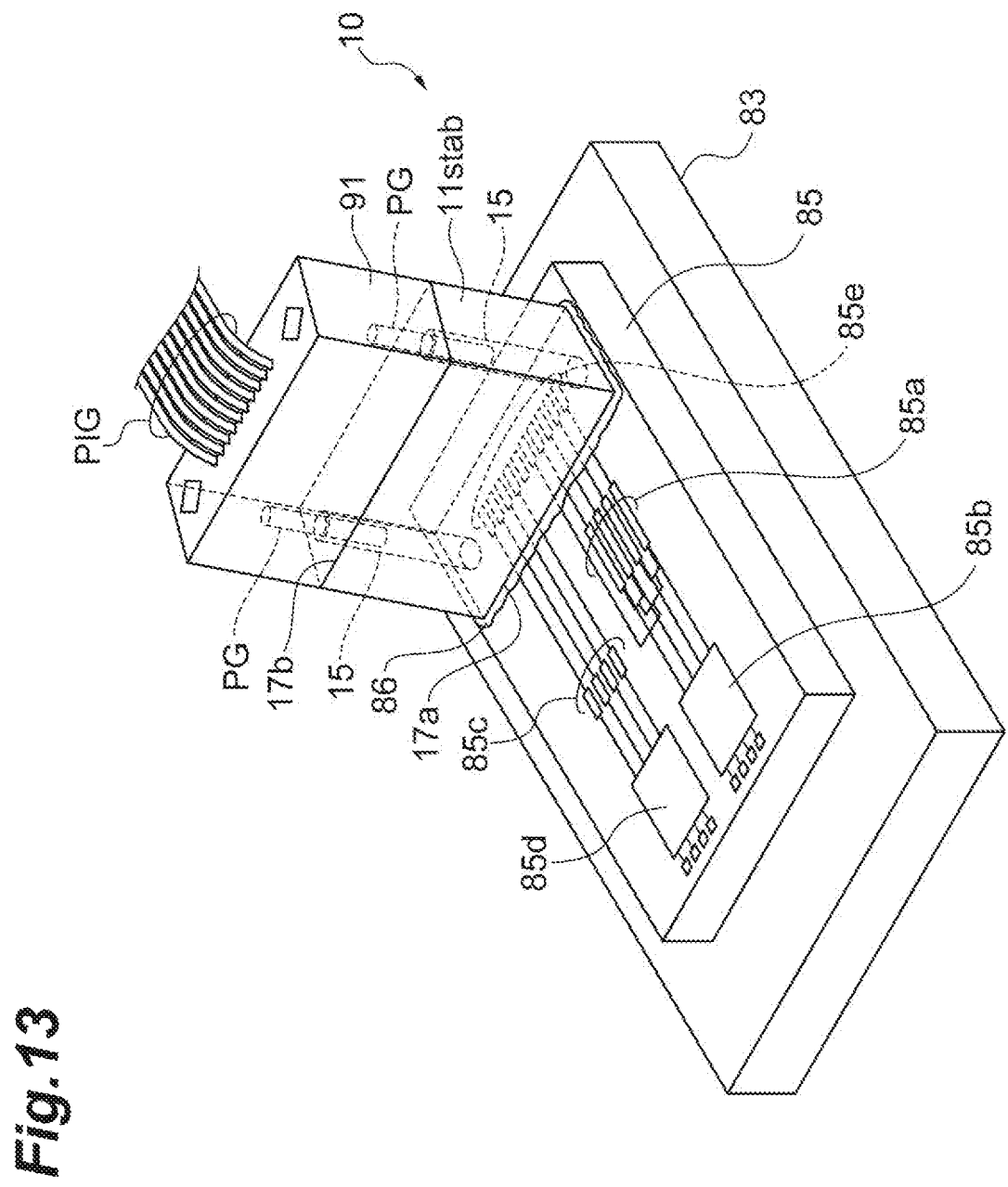
FIG. 13 is a view showing an optical communication apparatus according to the present embodiment.

FIG. 13 illustrates an optical communication device according to one aspect of the present embodiment. In the optical communication apparatus 10, the optical connecting part 11 is attached to an optical device, which encompasses, for example, a silicon photonics semiconductor device 85, a vertical cavity surface emitting laser (VCSEL) array, and a photodiode array. Referring to FIG. 13, in particular, the optical communication apparatus 10 includes, a stub device 11stab, an adhesive member 86, and a silicon photonics semiconductor device 85 used as an optical device. The silicon photonics semiconductor device 85 includes a monolithic integrated optical device (85a, 85c) and an optical coupling element 85e, and an optical element (85a, 85c) is optically coupled to the optical coupling element 85e. The silicon photonics semiconductor device 85 to be optically coupled includes a modulator 85a, a signal processing circuit 85b associated thereto for light transmission, a light receiving element 85c, a signal processing circuit 85d associated therewith for optical reception, and an optical coupling element 85e, such as a grating coupler, which allows optical coupling to an external device. In the silicon photonics semiconductor device 85, the modulation element 85a and the light-receiving element 85c are connected via an optical waveguide to the light-coupled device 85e. The modulator 85a is connected to the signal processing circuit 85b via a metal wiring layer, and the light receiving element 85c is connected to the signal processing circuit 85d via a metal wiring layer. In the optical communication device 10, in order to optically couple the stub device 11stab to the optical coupler 85e, the adhesive member 86 is applied to the end face of the stub device 11stab. The adhesive member 86 is likely to reach the other end face of the stub device 11stab through the hole of the guide member 15. The stub device 11stab that provides the guide member 15 with a stopper 15f can prevent the adhesive member 86 from reaching the end face of the stub device 11stab via the hole 15g of the guide member 15. The stub device 111stab in the optical communication device 10 has a structure that allows stable active optical alignment to achieve optical coupling between the silicon photonics semiconductor device 85 and the stub device 11stab. Further, the optical communication device 10 may further include an optical connector 91 to be connected to a silicon photonics semiconductor device 85. The optical communication apparatus 10 shown in FIG. 13 may include, for example, an optical connector device 11pig shown in FIG. 2B in place of the optical connector 91 having a pigtail fiber PIG.

In the present embodiment, the stub device 11stab is attached to the silicon photonics semiconductor device 85 so as to be optically coupled with the optical coupling element 85e thereof (the grating coupler). The optical connector 91 is optically coupled to the stub device 11stab. For alignment of the coupling, a short guide pin PG is disposed in the guide hole of the optical connector 91 and the guide member 15 of the stub device 11stab. The optical connector 91 is pluggable to the stub device 11stab. If necessary, the optical connector 91 is placed on the stub devices 11stab, the silicon photonics semiconductor device 85 or the substrate 83 such that the optical coupling can be maintained between the stub devices 11stab and the optical connector 91, and then the guide pin PG is removed therefrom. If necessary, the guide pin PG may be left without the removal.

In FIG. 13, in order to form the optical coupling between the optical fiber and the silicon photonics semiconductor device 85, both the pigtail optical connector 91 and the stub devices 11stab are used.

In mounting the stub device 11stab on the silicon photonics semiconductor device 85 so as to be optically coupled to a grating coupler in the silicon photonics semiconductor device 85, the optical connector CON for alignment is optically coupled to the stub device 11stab to guide light from the optical fiber pigtail to the stub device 11stab. Using the guided light allows the optical alignment of the optical coupling element 85e with the stub device 11stab. In this alignment, the optical connector device 11pig shown in FIG. 2B may be used in place of the optical connector CON. The guide member 15 of the optical connector device 11pig allows the magnetic attraction between the guide member 15 and the alignment pins GP to keep the optical coupling in the alignment stable. After the alignment, the optical connector CON or optical connector device 11pig may be removed, and in the method of fabricating the optical communication apparatus 10 in which an intermediate product comprising the substrate 83 mounting the silicon photonics semiconductor device 85 are fabricated, using the pluggable device makes the handling of the intermediate product easy.

After the manufacture of the optical communication device 10, prior to using the optical communication apparatus 10, the optical connector 91 or the optical connector device 11pig can be connected to the optical communication apparatus 10 with the guide pin PG. The optical connector of pigtail-type attached to the guide pin PG is optically connected to the stub devices 11stab mounted on the silicon photonics semiconductor device 85. The guide pin PG is held in the guide hole of the pigtail optical connector, and preferably may be fixed thereto. The optical connector 91 and the optical connector device 11pig each have a pigtail fiber PIG.

In attaching the stub device 11stab to the silicon photonics semiconductor device 85 such that the stub device 11stab can be optically coupled to the optical coupling element 85e of the silicon photonics semiconductor device 85, for example, an active alignment is used. The active alignment measures an electrical signal indicative of the amount of light received by, for example, the light receiving element 85c of the silicon photonics semiconductor device 85 via the optical fiber 13 of the stub device 11stab. The stubs device 11stab can be moved thereon to find an arrangement of the above devices in which the electrical signal indicating the amount of received light is made larger than or equal to a desired value. Determining the arrangement is to align the stub device 11*stab* and the optical coupling device 85*e* of the silicon photonics semiconductor device 85 with each other. During this optical alignment, the stub device 11*stab* receives light through an optical connector CON. Making the optical coupling between the optical connector CON and the stub device 11*stab* stable is important during the alignment. Magnetic coupling between the stub device 11*stab* of the guide member 15 and the alignment pin GP including magnetic material serves to increase the stability in the optical coupling.

Specifically, the addition of intensity variations due to instable optical coupling to the change in the amount of the received light in the positioning makes precise alignment difficult. In order to reduce the occurrence of unwanted change in the optical alignment, it is preferable to fix the optical connector CON and the stub device 11*stab* temporarily with each other.

The guide member 15 made of magnetic material containing a transition metal, such as nickel, is used to cause the magnetic force to act between the alignment pin GP of magnetic material and the guide member 15 of magnetic material. The use of magnetic force allows a temporary optical fixation between the optical connector CON and the stub devices 11*stab*.

Figure 14:
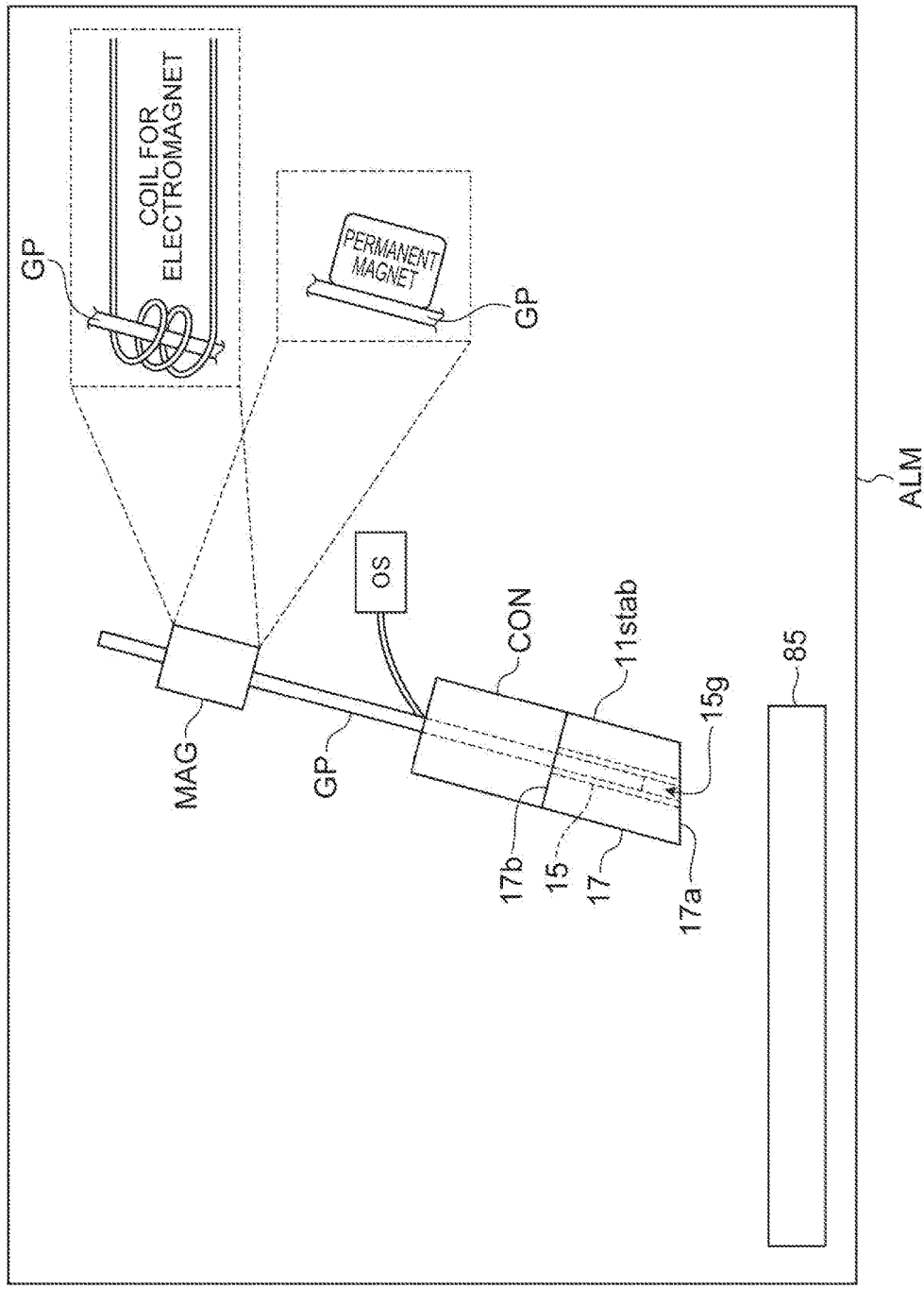
FIG. 14 is a view showing a major step in the method according to the present embodiment.

FIG. 14 is a schematic view showing an arrangement of the optical connectors CON and the stub device 11*stab* that are temporarily fixed in close contact with each other by magnetic force. The alignment pin GP of magnetic substance is fixed to the optical connector CON. The alignment pin GP of the optical connector CON is inserted into the guide member 15 of magnetic material, and the alignment pin GP thus inserted is magnetically coupled to a magnet apparatus MAG to energize magnetic force between the alignment pin GP of the optical connector CON and the stub device 11*stab* of the guide member 15. This magnetic force enables a temporary optical coupling between the optical connector CON and the stub device 11*stab*. Magnetic lines of force as shown in FIG. 3 is generated in the arrangement of the magnet apparatus MAG, the alignment pin GP and the guide member 15. The magnet apparatus MAG may include, for example, at least one of an electromagnet and a permanent magnet. Such a permanent magnet can be used as the magnet apparatus MAG instead of the current coil, and is brought closer to the alignment pin GP of magnetic material to form magnetic coupling between the alignment pin GP and the guide member 15. Either of the electromagnet or the permanent magnet can be used as the magnets apparatus MAG to generate lines of magnetic field as shown in FIG. 3. Adjusting a magnetic flux density at an end of the permanent magnet and a magnetomotive force of the coil end can provide a magnetic force effective in the temporary fixing of the alignment pin GP. In the subsequent description, an electromagnet coil is used as the magnet apparatus MAG. Current is applied to the electromagnet coil, which is coupled to the alignment pin GP, to generate a magnetic force (an attractive force) between the magnetic body of the alignment pin GP and the magnetic body of the guide member 15. This magnetic force can temporarily couple the optical connector CON with the stub device 11*stab*.

As shown in FIG. 3, the magnetic flux leakage from the side and end of the alignment pin GP generates the magnetic force that is exerted between the alignment pins GP and the guide member 15. In the vicinity of the end of the guide member 15, a magnetic flux leaking from the side of the alignment pins GP is coupled to the end of the guide member 15. These lines of magnetic field extends from the side of the alignment pin GP, and then is curved toward the longitudinal direction of the guide pin to extend toward the end of the guide member 15, so that the optical connector CON and the stub device 11*stab* are attracted to each other in the longitudinal direction of the alignment pins GP.

In the vicinity of the alignment pin GP in the hole 15*g* of the guide member 15, the lines of magnetic force are leaked from the side of the alignment pin GP and immediately enter the side wall of the guide member 15 to be coupled thereto. The lines of magnetic field thus entered extends substantially perpendicular to the longitudinal direction of the guide pin, so that the optical connector CON and the stub device 11*stab* are attracted to each other in the direction that is perpendicular to the longitudinal direction of the alignment pin GP. This force increases a rubbing force between the inner face of the hole 15*g* of the guide member and the side of the alignment pin GP (a frictional force between the inner face of the guide member 15 and the alignment pin GP), and is effective in maintaining the arrangement of the alignment pin GP and the guide member 15.

In the vicinity of the end of the alignment pin GP in the hole 15*g* of the guide member 15, the lines of magnetic force leak from the end face of the alignment pin GP toward the side wall of the guide member 15 and run along the side wall of the guide member 15. The magnetic field has a component parallel to the longitudinal direction of the guide pin, so that in this portion, the optical connector CON, the stub device 11*stab*, and the alignment pin GP are attracted mutually.

In addition to the magnetic force, a normal force to the inner face of the guide member 15 (i.e., the frictional force) acts between the alignment pin GP and the guide member 15. The magnetic force and the frictional force prevent the optical light connector CON and the stub device 11*stab* from moving away from each other, and help achieve a temporary fixation between the optical connector CON and the stub device 11*stab*. Specific estimates conducted by the inventor reveals that a net force of the magnetic force and the frictional force of 0.1 N to 2N enables the temporary fixation. Material of the alignment pin GP may comprise a magnetic material, such as, nickel (Ni) or stainless steel with magnetism, and preferably, a hard cemented carbide, which enables a desired pin diameter, allows the adjustment of the amount of WC solid solution in a nickel binder, thereby providing magnetism over the cemented carbide. Further, as already described, the guide member can be a metal tube with inner and outer diameters precisely controlled by electroforming, and the material may be Ni in terms of easy machining.

An optical device is prepared, and the optical device is to be optically coupled to a temporary assembly comprising an alignment pin GP, a stub device 11*stab*, and an optical connector CON. As shown in FIG. 14, the temporary assembly is placed on an optical device (e.g., a silicon photonics semiconductor device 85). In the temporary assembly, the alignment pin GP is located in the guide hole of the optical connector CON and the hole 15*g* of the stub device 11*stab*, so that the alignment pin GP aligns the stub device 11*stab* and optical connector CON with each other. Magnetic force is applied to the alignment pin GP in the temporary assembly using a magnet apparatus MAG. While maintaining the magnetic field of the magnet apparatus MAG, active optical alignment is carried out by moving the temporary assembly with an alignment device ALM. The alignment device ALM supports the temporary assembly, and has a mechanism allowing the temporary assembly to move on the optical device without the magnet apparatus MAG. Light from a light source OS is supplied to the optical device (for example, the silicon photonics semiconductor device 85) to perform positioning of the stub device 11*stab* and the optical connector CON by an optical alignment. An adhesive containing, for example, ultraviolet curing agent is applied thereto with the temporary fixation of the stub device 11*stab* and the optical connector CON being kept and the alignment of the stub device 11*stab* and the optical coupling element 85*e* of the silicon photonics semiconductor device 85 being maintained.

Figure 15:
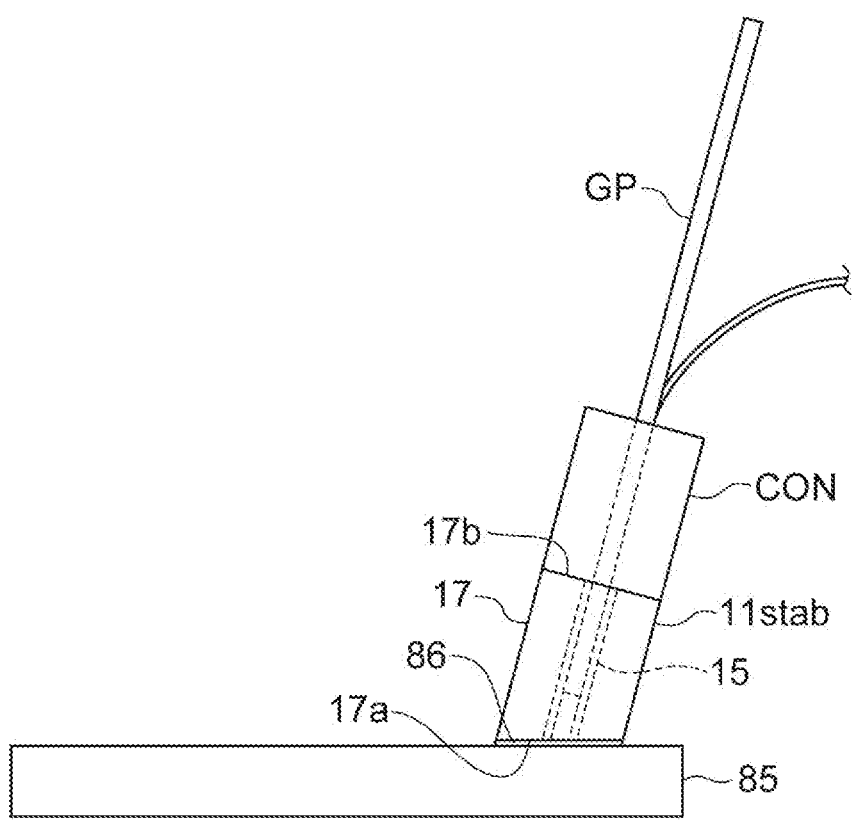
FIG. 15 is a view showing a major step in the method according to the present embodiment.

In mounting the stub device 11*stab* on the silicon photonics semiconductor device 85, as shown in FIG. 15, the stub device 11*stab* is fixed to the silicon photonics semiconductor device 85 by an adhesive member 86 formed by solidification of the adhesive with the magnetic field kept after the positioning.

In place of the optical connector CON, the optical connector device 11*pig* can be used, and the optical connector device 11*pig* and the stub device 11*stab* can be optically coupled to each other using magnetic force to achieve temporary optical coupling therebetween. In the use of the optical connector device 11*pig*, the alignment pin GP of the magnetic material is held by the guide member 15 of the optical connector device 11*pig* during the optical coupling. For enabling the holding, for example, the guide member 15 of an optical connector device 11*pig* is fixed to the alignment pins GP to be integrated with the alignment pins GP.

Figure 16:
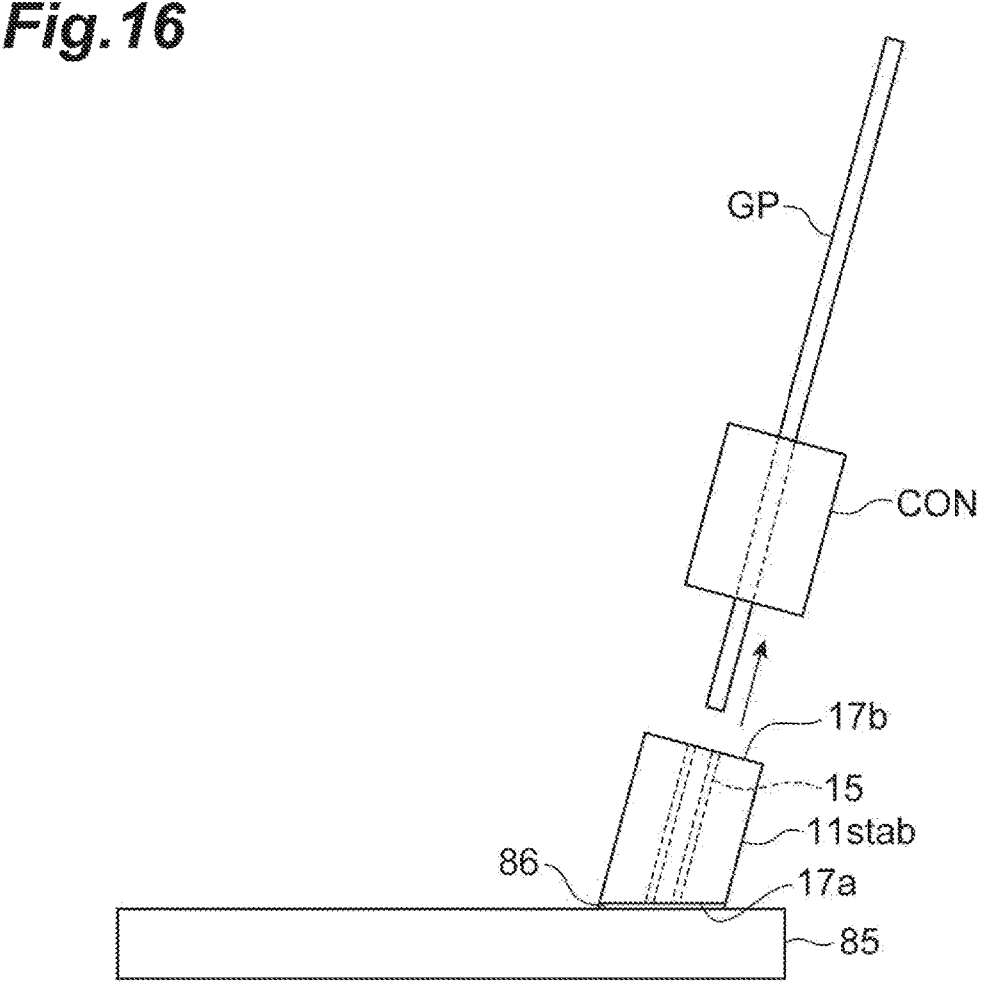
FIG. 16 is a view showing a major step in the method according to the present embodiment.

As shown in FIG. 16, after the fixation, the application of the magnetic field is released, so that the optical connector CON and alignment pins GP can be separated from the stub device 11*stab*. More specifically, the current of the coil of the magnet apparatus is turned off (or, the permanent magnet is moved away from the magnetic body of the guide pin) to release the temporary optical coupling. The releasing allows the optical connector CON to be easily separated from the stub device 11*stab*. The separation of the optical connector CON from the stub device 11*stab* completes the optical communication device 10. The optical communication apparatus 10 includes the silicon photonics semiconductor device 85, and the stub device 11*stab*, which is positioned on the silicon photonics semiconductor device 85.

In the process of mounting the stub device 11*stab* on the silicon photonics semiconductor device 85 so as to be optically coupled to the optical coupling element 85*e* of the silicon photonics semiconductor device 85, light from the optical connector CON is given to the silicon photonics semiconductor device 85 (for example, the light-receiving element 85*c*) through the stub device 11*stab* to perform optical positioning according to the amount of light which the light-receiving element 85*c* receives, so that the stub device 11*stab* is optically coupled to the optical coupling element 85*e* of the silicon photonics semiconductor device 85. What is desired in the positioning is to maintain a stable optical coupling between the optical connector CON and the stub device 11*stab* during monitoring the amount of light. Variation in the quantity of monitoring light, which is caused by changes in the optical coupling between the optical connector CON and the stub device 11*stab*, makes the optical positioning complicated. In the present embodiment, the temporary application of magnetic force enables the temporary holding in terms of optical coupling to prevent optical coupling between the optical connector CON and the stub device 11*stab* from fluctuating greatly. This state is referred to as "holding state". In "holding state", alignment of the stub device 11*stab* with an optical component is performed. After the positioning, the stub device 11*stab* can be fixed to the optical component, for example, by an adhesive including an ultraviolet curing agent. The temporary fixation ("holding state") between the optical connector CON and the stub device 11*stab* is released after the stub device 11*stab* has been fixed by an adhesive to the optical component. This state is referred to as "open state". In the "open state", it is easy to handle the optical device including a substrate 83 mounted with the optical parts.

As described above, the stub device 11*stab* shown in FIG. 2A allows the presence or absence of a magnetic field to switch between the holding state and the open state. Technical requirement in the optical connector CON using the alignment pin GP for positioning is to stably hold the positioning between the optical connector CON and the optical devices paired therewith. In this positioning, the holding state and the open state can be easily switched. As seen from the description of the connection between the stub device 11*stab* and the optical connector CON, the optical connector device 11*pig* shown in FIG. 2B and the stub devices 11*stab* also allow the presence or absence of a magnetic field to switch between the holding state and the open state.

Figure 17:
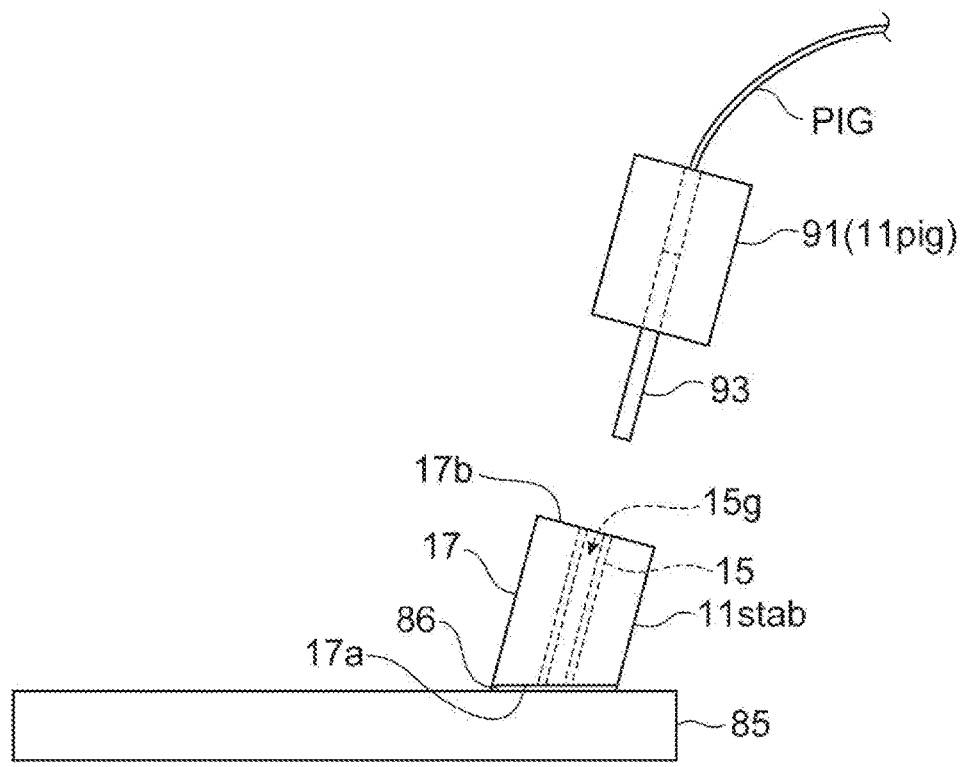
FIG. 17 is a view showing a major step in the method according to the present embodiment.

As shown in FIG. 17, an optical connector 91 is prepared for the optical communication silicon photonics semiconductor device 85. The optical connector 91 has a guide hole for receiving the guide pin 93 therein, and is aligned with the stub device 11*stab* by the guide pin 93. The guide pin 93 protrudes from the end face of the optical connector 91 and does not protrude from the other end face. The optical connector 91 comprises a pigtail.

Figure 18:
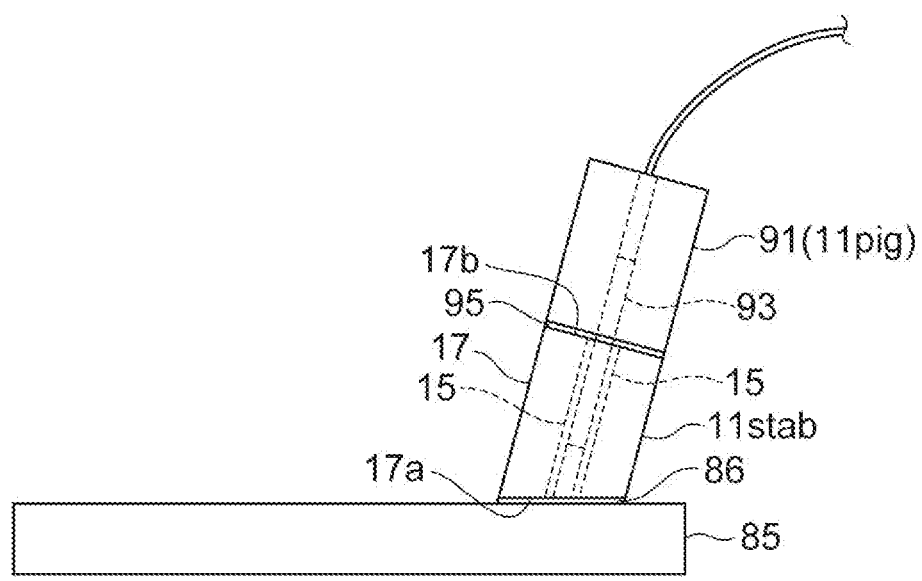
FIG. 18 is a view showing a major step in the method according to the present embodiment.

As shown in FIG. 18, the optical connector 91 for optical communication in the silicon photonics semiconductor device 85 is connected to the stub device 11*stab*. The end part of the guide pin 93 projecting from the end face of the optical connector 91 is inserted into the hole 15*g* of the guide member 15 of the stub device 11*stab*. The end part of the guide pin 93 is in the middle of the hole 15*g*. In the present process, the optical communication apparatus 10 includes the silicon photonics semiconductor device 85, and the stub device 11*stab* that has been positioned in the silicon photonics semiconductor device 85, and the optical connector 91 optically coupled to the stub device 11*stab*. The optical connector 91 has a pigtail fiber PIG, which is optically coupled to the silicon photonics semiconductor device 85. If necessary, the optical connector 91 can be secured to the stub device 11*stab* with an adhesive 95.

FIGS. 19A, 19B and 19C are views each showing an optical connecting part according to the present embodiment. FIG. 19A shows a single-mode optical fiber SMF, which can be used for optical fiber 13, having a diameter of 0.125 mm. FIG. 19B shows the glass parts (e.g., Tempax glass) used as the first member 19 and the second member 21 for the holder 17. FIG. 19C shows a cylinder of magnetic metal MMT used as the guide member 15 in the optical connecting part 11. An exemplary structure which can be connected to a MT connector is shown below.

Width of the holder W: 7 mm.
Holder of the depth: 3 mm.
The height of the first member of the holder H1: 1.2 mm.
The height of the second member of the holder H2: 1.2 mm.
The second center-to-center spacing of the support portion L1 for the guide member: 4.6 mm (tolerance, −0.001 to +0.001 mm).
Center-to-center spacing of the first support for the optical fiber L2: 0.25 mm (tolerance, −0.001 to +0.001 mm).
Hole size of the second support portion for the guide members L3: 0.90 mm (tolerance, −0.001 to +0.001 mm).
Outer diameter DOUT of the magnetic metal tube MMT: 0.8995 mm (tolerance, −0.0005 to +0.0005 mm).

Magnetic metal tube MMT of inner diameter DIN: 0.70 mm (tolerance, −0.0005 to +0.0005 mm).
Outer diameter of the guide pin PG, which is inserted into the guide member: 0.699 mm.
Apex angle of the V-shaped groove for an optical fiber: 70 degrees.
Pitch of the optical fiber V-grooves: 0.25 mm.
On both sides of the array of V-shaped groove for the optical fiber, the V-shaped grooves for the guide pipe are provided.
Apex angle of the V-shaped groove for the magnetic metal cylinder: 70 degrees.
The distance between the top of the two V-shaped grooves for magnetic metal tubes: 4.6 mm.
Positional accuracies of the positioning V-shaped groove and the guiding member of the V-shaped groove for the optical fiber may be in the range of −1.0 to +1.0 micrometers with respect to the respective desired positions. The inner diameter and the outer shape of the magnetic metal tube are precisely controlled. As already described, such a magnetic metal tube may be fabricated, for example, by electroforming.

Glass plates are prepared for the first member 19 and the second member 21 of the holder 17. On at least one of the glass plates for the first member 19 and the second member 21, the first support portion 17c and the second support portion 17d, specifically, V-shaped grooves (groove with a V-shape in cross section) for the optical fiber 13 and the guide member 15 (for example, magnetic metal cylinder) may be formed. The first support portion 17c has one of various shapes capable of supporting the optical fiber 13, and the second support portion 17d has one of various shapes capable of supporting the guide member 15. Hence, the shape of each of the first support portion 17c and the second support portion 17d is not limited to the specific shape, which is shown as an example.

In the embodiment, the exemplary optical connecting part 11 is used as a stub devices and an optical connector device. These devices can be produced by the following fabrication process: a process of forming, on the two glass plates, V-grooves, each of which has a predetermined machining accuracy, for an optical fiber and the guide tube of the magnetic material by machining to prepare two V-grooved glass plates; a process of disposing optical fibers and magnetic guide tubes in the respective grooves in one of the V-grooved glass plates: and covering the V-grooved glass plate with the other V-grooved glass plate to fix the two V-grooved glass plates by an adhesive; and a process of polishing end faces of the V-grooved glass plates adhering to each other, and ends of the optical fibers together. The above uncomplicated process flow can fabricates an optical connector with an excellent mechanical strength.

In the above process, in disposing the optical fibers and the magnetic guide pipes in the respective V-grooves of the V-grooved glass plates to hold the optical fibers and the magnetic guide pipes therebetween, the end of each guide pipe projects from the end faces of the glass plates by about 0.1 to 0.3 mm, and the end of each optical fiber projects from the end faces of the glass plates by 0.1 to 0.3 mm. In supplying the adhesive for bonding the glass surfaces of the V-grooved glass plates to each other, these projections can prevent the penetration of the adhesive to the ends of the magnetic guide tube and the optical fibers. The projecting end portions of the optical fibers and the magnetic guide tubes, and the V-grooved glass plates may be polished to form a flat end face for optical coupling. In addition to the positioning of the ends of the optical fiber core and the magnetic guide tube, the polishing can provide the V-grooved glass plates with flat end faces. If necessary, the polished face may be formed perpendicular to the longitudinal direction of the optical fibers or may be formed to be inclined at an angle of about 6 to 8 degrees with respect to the plane perpendicular to the longitudinal direction of the optical fibers. The polishing enables the formation of a flat face or a curved face slightly projecting outward.

One of both glass plates may have V-shaped grooves. The above description is given of two glass members, which hold the optical fiber and the guide pipe, provided with V-grooves arranged in vertically symmetric with respect to the arraying plane along which the guide pipe and the optical fibers are disposed in the holder, and V-shaped grooves may be formed in one of the glass members and the other glass member may not be subjected to processing of groove formation.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:
1. An optical connecting part including:
at least one optical fiber;
a tubular guide member having an end, another end, a side wall extending in a direction from the end to the another end to define a hole extending in the direction, and a stopper disposed between the end of the tubular guide member and the another end of the tubular guide member, the side wall including a magnetic body, the stopper extending from the side wall so as to intersect the direction and also including a magnetic body; and
a holder having an end face, another end face, a first supporting portion supporting the optical fiber, and a second supporting portion supporting the guide member, wherein
the second supporting portion extends in the direction, and
the another end of the tubular guide member is disposed at the another end face of the holder.
2. The optical connecting part according to claim 1, wherein the optical connecting part includes a stub device having the optical fiber, the tubular guide member, and the holder.
3. The optical connecting part according to claim 1, wherein the tubular guide member is made of magnetic material.
4. The optical connecting part according to claim 1, wherein the tubular guide member has a cylindrical shape.
5. The optical connecting part according to claim 1, wherein the tubular guide member has a metal tube.
6. The optical connecting part according to claim 1, wherein the first supporting portion extends in the direction.
7. The optical connecting part according to claim 1, wherein the first supporting portion has a through-hole extending in the direction.
8. The optical connecting part according to claim 1, wherein the second supporting portion has supporting faces extending in the direction, an outer side of the side wall of the tubular guide member being in contact with the supporting faces.
9. The optical connecting part according to claim 1, wherein the optical fiber has an end disposed at the another end face of the holder.

10. The optical connecting part according to claim 1, wherein the second supporting portion has a through-hole extending from the end face of the holder to the another end face thereof in the direction.

11. The optical connecting part according to claim 1, wherein the holder includes glass.

12. An optical communication apparatus including:
- a silicon photonics semiconductor device monolithically integrating an optical coupling element, and an optical element optically coupled to the optical coupling element;
- an optical connecting part including a stub device, the stub device including at least one optical fiber, a tubular guide member having an end, another end, and a side wall extending in a direction from the end to the another end to define a hole extending in the direction, the side wall including a magnetic body, and a holder having an end face, another end face, a first supporting portion supporting the optical fiber, and a second supporting portion supporting the guide member, the second supporting portion extending in the direction, and the another end of the tubular guide member being disposed at the another end face of the holder, and the connecting part being optically coupled to the optical coupling element of the silicon photonics semiconductor device; and
- an adhesive member fixing the optical connecting part to the silicon photonics semiconductor device.

13. The optical communication apparatus according to claim 12, wherein the tubular guide member includes a stopper disposed between the end of the tubular guide member and the another end of the tubular guide member, the stopper extending from the side wall so as to intersect the direction and also including a magnetic body.

14. The optical communication apparatus according to claim 12, wherein
- the tubular guide member is made of nickel (Ni) as a magnetic material, and
- the optical connecting part includes a pigtail type optical connector having the optical fiber, the tubular guide member, and the holder.

15. The optical communication apparatus according to claim 12, wherein the optical connecting part includes a stub device having the optical fiber, the tubular guide member, and the holder.

* * * * *